United States Patent
Hida et al.

(10) Patent No.: US 11,142,257 B2
(45) Date of Patent: Oct. 12, 2021

(54) VEHICULAR ROOF STRUCTURE

(71) Applicant: HONDA MOTOR CO., LTD., Tokyo (JP)

(72) Inventors: Kazunori Hida, Wako (JP); Daisuke Ebihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/752,706

(22) Filed: Jan. 27, 2020

(65) Prior Publication Data
US 2020/0262485 A1    Aug. 20, 2020

(30) Foreign Application Priority Data
Feb. 15, 2019 (JP) .............................. JP2019-025926

(51) Int. Cl.
| | | |
|---|---|---|
| B62D 25/06 | (2006.01) | |
| B62D 25/02 | (2006.01) | |
| B62D 27/02 | (2006.01) | |
| B62D 25/08 | (2006.01) | |
| B62D 25/04 | (2006.01) | |

(52) U.S. Cl.
CPC ............. *B62D 25/06* (2013.01); *B62D 25/04* (2013.01); *B62D 25/08* (2013.01); *B62D 27/02* (2013.01)

(58) Field of Classification Search
CPC .. B60J 5/10; B60J 5/101; B62D 25/06; B62D 25/02
USPC .......................... 296/210, 213, 146.8, 106, 56
See application file for complete search history.

(56) References Cited

U.S. PATENT DOCUMENTS

| | | | | |
|---|---|---|---|---|
| 4,634,173 A | * | 1/1987 | Aonuma ................ | B62D 25/06 296/203.04 |
| 7,618,084 B2 | * | 11/2009 | Kimura .................... | B60J 5/101 296/146.11 |
| 2014/0138988 A1 | | 5/2014 | Kisaku et al. | |

FOREIGN PATENT DOCUMENTS

| | | |
|---|---|---|
| JP | 2001-063622 | 3/2001 |
| JP | 4305154 | 7/2009 |
| JP | 5621045 | 11/2014 |
| JP | 2015-020609 | 2/2015 |
| JP | 5811910 | 11/2015 |
| JP | 2017-149175 | 8/2017 |
| JP | 2019-001185 | 1/2019 |

OTHER PUBLICATIONS

Japanese Office Action for Japanese Patent Application No. 2019-025926 dated Dec. 1, 2020.

* cited by examiner

*Primary Examiner* — Dennis H Pedder
(74) *Attorney, Agent, or Firm* — Amin, Turocy & Watson, LLP

(57) ABSTRACT

A vehicular roof structure has a roof side rail joined to a roof panel. The roof panel includes an inclined joining section, a vertical section and a horizontal joining section. The inclined joining section has an outer side portion of the roof panel that is bent inward in a vehicle width direction, and the roof side rail is joined thereto. The vertical section is provided on the inclined joining section on a rearward side of the vehicle body, and the outer side portion of the roof panel is bent vertically. The horizontal joining section protrudes outward from the vertical section in the vehicle width direction. A tail gate hinge is attached to the horizontal joining section.

10 Claims, 16 Drawing Sheets

VEHICULAR ROOF STRUCTURE

CROSS-REFERENCE TO RELATED APPLICATION

Priority is claimed on Japanese Patent Application No. 2019-025926, filed Feb. 15, 2019, the content of which is incorporated herein by reference.

BACKGROUND OF THE INVENTION

Field of the Invention

The present invention relates to a vehicular roof structure.

Description of Related Art

As a vehicular roof structure, for example, a configuration in which an inner-side longitudinal wall section of the roof side rails in a vehicle width direction is joined to an outer side part (a bent section) of a roof panel in the vehicle width direction through brazing (including soldering, laser welding, one-side continuous welding, or the like) is known. Among the side outer panel, the roof side rail is a portion that covers a skeleton extending in a forward/rearward direction at the left and right sides of a vehicle body upper section.

In the roof panel, a bent section is formed on an outer side in the vehicle width direction, and a folded section is formed on an end side in a vehicle body forward/rearward direction through pressing. Here, in order to press the bent section and the folded section, a notch is formed in a region in which the bent section and the folded section cross each other (for example, see Japanese Patent No. 5811910).

In addition, as a vehicular roof structure, a configuration in which a gate pillar is provided on a rear section in an outer side portion of a roof panel on a rear side of a vehicle body and a tail gate hinge is attached to a gate pillar is known. A tail gate is supported by a tail gate hinge so as to be openable and closable (for example, see Japanese Patent No. 4305154).

SUMMARY OF THE INVENTION

However, in the vehicular roof structure in Japanese Patent No. 5811910, longitudinal wall sections of the roof side rails are joined to a bent section of the roof panel through brazing, and a notch is formed in a region in which the bent section and the folded section cross each other. Accordingly, a device is required to ensure strength and rigidity of the region in which the bent section and the folded section of the roof panel cross each other. For this reason, it is difficult to provide the tail gate hinge in the crossing region and support the tail gate using the tail gate hinge. That is, in a state in which the roof side rails are joined to the roof panel through brazing, it is difficult to attach exterior parts such as a tail gate hinge, a tail gate, or the like to the outer side portion of the roof panel. In addition, the vehicular roof structure disclosed in Japanese Patent No. 4305154 has no space sufficient to attach the tail gate hinge in a state in which the roof panel is attached to the gate pillar.

An aspect of the present invention is directed to providing a vehicular roof structure capable of attaching exterior parts to an outer side portion of a roof panel in a state in which roof side rails are joined to a roof panel.

(1) A vehicular roof structure according to an aspect of the present invention is a vehicular roof structure in which a roof side rail is joined to a roof panel, the roof panel including: an inclined joining section having an outer side portion bent inward in a vehicle width direction and to which the roof side rail is joined; a vertical section provided on at least one side of the inclined joining section in a vehicle body forward/rearward direction and having an outer side portion that is bent vertically; a horizontal joining section protruding outward from the vertical section in the vehicle width direction; and an exterior part attached to the horizontal joining section.

According to the aspect of the above-mentioned (1), since the inclined joining section is formed on the roof panel and the roof side rail is joined to the inclined joining section, the roof panel can be mounted on the roof side rail from above and joined thereto through brazing. Further, the vertical section is provided on at least one side of the inclined joining section in the vehicle body forward/rearward direction, and the horizontal joining section protrudes outward from the vertical section in the vehicle width direction. Since the horizontal joining section on at least one side in the vehicle body forward/rearward direction protrudes outward in the vehicle width direction, the horizontal joining section can be mounted on the vehicle body (for example, the roof side rail, the gate pillar, or the like) from above and joined thereto through spot welding.

In addition, according to the aspect of the above-mentioned (1), when the roof side rail is joined to the inclined joining section of the roof panel through brazing, the horizontal joining section is disposed to be freely movable with respect to the vehicle body (for example, the roof side rail, the gate pillar, or the like) in the vehicle width direction. Accordingly, there is no risk of the horizontal joining section interfering with joining of the roof side rail to the inclined joining section through brazing.

Further, since the exterior part (for example, an attachment section of the exterior part) is attached to the horizontal joining section and the attachment section of the exterior part is added to the horizontal joining section and the member on the side of the vehicle body, a plate thickness can be increased. Accordingly, support strength of the exterior part can be increased, and further, coupling strength of the roof panel and the vehicle body can be increased.

(2) In the aspect of the above-mentioned (1), the horizontal joining section may be formed integrally with a vertical joining section joined to the horizontal joining section so as to protrude downward along the vertical section, and a roof joining section having an L-shaped cross section may be formed by the horizontal joining section and the vertical joining section.

According to the aspect of the above-mentioned (2), the separate vertical joining section is joined to the vertical section to protrude downward along the vertical section, and the horizontal joining section is formed integrally with the vertical joining section. Accordingly, the horizontal joining section can be disposed below the roof panel, where pressing is normally not able to be performed. Accordingly, the exterior part does not protrude upward from the roof panel, i.e., the exterior part (for example, the tail gate hinge or the like) can be attached to a lower side of the roof panel.

In addition, since the roof joining section having an L-shaped cross section is formed integrally with the horizontal joining section and the vertical joining section and the vertical joining section is joined to the vertical section, only a plate thickness dimension of the roof joining section in the roof panel can be sufficiently greatly secured. Accordingly, attachment strength of the exterior part can be increased without exerting an influence on reduction of weight of the roof panel (i.e., the vehicle body) in a state in which the exterior part is attached to the horizontal joining section.

Incidentally, in the roof panel, the inclined joining section and the vertical section are formed on the outer side portion in the vehicle width direction, and further, the bent section is formed on the rear end portion in the vehicle body forward/rearward direction through pressing. Here, in order to press the vertical section and the bent section, a notch (an opening section) is formed in a corner in which the vertical section and the bent section cross each other.

Here, since the roof joining section is provided as a member that is separate from the roof panel, a joining corner swelling toward an outer side of the vehicle can be formed on the roof joining section. Accordingly, the notch of the roof panel can be closed by the joining corner.

Further, since the roof joining section is provided as a member that is separate from the roof panel, an attachment hole can be formed in the horizontal joining section of the roof joining section, and the exterior part can be attached to the attachment hole.

(3) In the aspect of the above-mentioned (1) or (2), the vehicular roof structure may include a gate pillar extending from the roof side rail toward a rear side of the vehicle body and in which the horizontal joining section is provided; and a shielding plate joined to a front section of the gate pillar.

Incidentally, since the inclined joining section and the vertical section can be formed on the roof panel through, for example, pressing, a gap region is considered to be formed between the inclined joining section and the vertical section and between the inclined joining section and the horizontal joining section.

Here, the gap region between the inclined joining section and the vertical section is provided to enable cutting and pressing of a portion in which a pressing direction of the roof panel is changed, and the gap region between the inclined joining section and the horizontal joining section is provided to avoid interference when the horizontal joining section is mounted on the gate pillar from above. Accordingly, the gap region is formed in the vicinity of the rear end portion of the roof side rail.

Here, in the aspect of the above-mentioned (3), the front section of the gate pillar is joined to the shielding plate. The gate pillar has a section in which the horizontal joining section is attached to a side of the front section, and extends from the rear end portion of the roof side rail toward a rear side of the vehicle body. Accordingly, the shielding plate can be disposed on the rear end portion of the roof side rail, and the gap region can be closed by the shielding plate.

(4) In the aspect of the above-mentioned (3), the shielding plate may have a front shielding wall and a side shielding wall that forms in a substantially L-shaped cross section, the front shielding wall and the side shielding wall may be joined to a front edge and a side edge of the front section of the gate pillar, and the front edge may be joined to a rear end portion of the roof side rail.

Incidentally, the horizontal joining section is disposed below the roof panel, and an interval between the horizontal joining section and the roof side rail in the upward/downward direction increases inward in the vehicle width direction. For this reason, a shape of the shielding plate increases to close the gap region with the shielding plate, and it is considered to widen a painting region on which a sealing material for rust prevention is applied.

Here, in the aspect of the above-mentioned (4), a substantially L-shaped cross section is formed by the front shielding wall and the side shielding wall, and the front shielding wall and the side shielding wall are joined to the front edge and the side edge of the front section of the gate pillar. Accordingly, the front shielding wall, the side shielding wall and the front section of the gate pillar form an L-shaped three-surface joint structure, and strength and rigidity are increased. In the three-surface joint structure, the front shielding wall is joined to the rear end portion of the roof side rail. Accordingly, the three-surface joint structure reinforces the painting region of the sealing material, and the sealing material can be prevented from being exfoliated from the painting region.

(5) In the aspect of the above-mentioned (4), a rear wall of a rear end portion of the roof side rail may be disposed while having an interval with respect to the front edge of the front section of the gate pillar in a state the rear wall of the rear end portion of the roof side rail overhangs toward a rear side of the vehicle body, and the front shielding wall may have a joining extension section disposed in a region between the rear wall and the front edge which are disposed so as to have an interval in the vehicle body forward/rearward direction and is joined to the rear wall and the front edge.

Here, it is considered that the rear wall of the rear end portion of the roof side rail overhangs at an interval on a rearward side of the vehicle body with respect to the front edge of the front section of the gate pillar. In addition, the roof side rail has the folded section formed to join to the inclined joining section of the roof panel. For this reason, from a viewpoint when the roof side rail is pressed or assembled, it is difficult to extend the rear wall of the rear end portion of the roof side rail to the front edge of the front section of the gate pillar.

Therefore, in the aspect of the above-mentioned (5), the front shielding wall is provided on the shielding plate, and the front shielding wall is disposed in the region between the rear wall of the rear end portion of the roof side rail and the front edge of the front section of the gate pillar and is joined to the rear wall and the front edge.

Accordingly, the gap region between the rear wall of the rear end portion of the roof side rail and the front edge of the front section of the gate pillar can be closed by the front shielding wall of the shielding plate. In addition, since the front shielding wall is joined to the rear wall and the front edge, strength and rigidity of the connecting section (i.e., the vehicle body) between the rear end portion of the roof side rail and the front section of the gate pillar can be increased.

(6) In the aspect of the above-mentioned (4) or (5), the side shielding wall of the shielding plate may be disposed on an inward side of the vehicle in a state standing upward from the front section of the gate pillar, and the shielding plate comprises a seal shelf section provided on a forward side of the side shielding wall in the vehicle body. According to the aspect of the above-mentioned (6), since the seal shelf section is provided on the base section on a front side of the vehicle body, the seal shelf section can be disposed below the gap occurring in the joint section between the roof side rail and the roof panel. Accordingly, when the seal material is painted in the gap in the joint section between the roof side rail and the roof panel, the seal material can be prevented from falling onto a rear side of the gap (i.e., an inner side of the vehicle). Accordingly, the gap in the joint section can be reliably filled with the seal material.

(7) In the aspect of any one of the above-mentioned (3) to (6), the gate pillar may include an outer gate pillar that abuts a back surface of the horizontal joining section; an inner gate pillar provided on the outer gate pillar on an inward side of the vehicle; and a gusset provided between the outer gate pillar and the inner gate pillar, an upper surface of the gusset may be joined to the outer gate pillar, and a lower surface of the gusset may be joined to the inner gate pillar.

In the aspect of the above-mentioned (7), the outer gate pillar of the gate pillar abuts the back surface of the horizontal joining section, the upper surface of the gusset is joined to the outer gate pillar, and the lower surface of the gusset is joined to the inner gate pillar. Accordingly, the load input to the exterior part attached to the horizontal joining section can be transmitted to the inner gate pillar from the outer gate pillar via the gusset. Accordingly, the load can be supported by the entire gate pillar.

Further, since the gusset is provided between the outer gate pillar and the inner gate pillar, the gusset can prevent the gate pillar from being squized or twisted. Accordingly, strength and rigidity of the gate pillar can be increased.

(8) In the aspect of the above-mentioned (7), the gusset may have a working hole in a section corresponding to a fastening member configured to attach the exterior part to the horizontal joining section.

Here, the exterior part is attached to the horizontal joining section by the fastening member. In addition, the fastening member is disposed above the gusset. Here, in the aspect of the above-mentioned (8), the working hole is formed in the gusset, and the working hole corresponds to the fastening member. Accordingly, a tool can be inserted into the fastening member from below the gusset (i.e., an inner side of the vehicle (a side of a passenger compartment)) via the working hole, and the fastening member can be fastened by the tool. Accordingly, a degree of freedom when a process of attaching the exterior part to the horizontal joining section is determined can be enhanced. Accordingly, the exterior part can be attached to the horizontal joining section by an appropriate process, and assembly workability can be improved.

Further, when the exterior part is attached to the horizontal joining section by the fastening member, there is no need to commonly fasten the gusset using the fastening member together with the horizontal joining section and the exterior part. Accordingly, the members fastened by the fastening member can be reduced. Accordingly, when the exterior part is attached to the horizontal joining section, management accuracy of a tightening torque of the fastening member can be increased, and, for example, occurrence of rattling or loosening of the exterior part with respect to the horizontal joining section can be minimized.

(9) In the aspect of the above-mentioned (5), a rear end portion of the roof side rail may be formed from an upper end to a lower end in an inclined shape at a downward gradient toward a rear side of the vehicle body, the exterior part may have a front end portion formed along the rear end portion of the roof side rail and may be supported to be freely openable and closable with respect to the vehicle body while having a hinge shaft attached to the horizontal joining section as an axis, and the rear end portion of the roof side rail may overhang toward a rear side of the vehicle body with respect to the front end portion of the gate pillar in a region disposed on a further forward side of the vehicle body than a rotational center of the hinge shaft, and the rear end portion of the roof side rail may be disposed on a further forward side of the vehicle body than the front end portion of the gate pillar in a region disposed on a further rearward side of the vehicle body than the rotational center of the hinge shaft.

In the aspect of the above-mentioned (9), the rear end portion of the roof side rail overhangs toward a rear side of the vehicle body with respect to the front end portion of the gate pillar in the region in which the rear end portion of the roof side rail is disposed on a further forward side of the vehicle body than the rotational center of the hinge shaft. Accordingly, when the exterior part is opened and closed, the front end portion of the exterior part can be moved to the overhang region. That is, the front end portion of the exterior part can be prevented from interfering with the rear end portion of the roof side rail. Accordingly, in a state in which the exterior part is closed, the front end portion of the exterior part can approach the rear end portion of the roof side rail. Further, the rear end portion of the roof side rail is disposed on a further forward side of the vehicle body than the front end portion of the gate pillar in the region in which the rear end portion of the roof side rail is disposed on a further rearward side of the vehicle body than the rotational center of the hinge shaft. Accordingly, when the exterior part is opened and closed, the front end portion of the exterior part can be moved above the rear end portion of the roof side rail. That is, the front end portion of the exterior part can be prevented from interfering with the rear end portion of the roof side rail. Accordingly, in a state in which the exterior part is closed, the front end portion of the exterior part can approach the rear end portion of the roof side rail.

In this way, the front end portion of the exterior part can approach the rear end portion of the roof side rail in the region in which the rear end portion of the roof side rail is disposed on a further forward side of the vehicle body or a further rearward side of the vehicle body than the rotational center of the hinge shaft. Accordingly, since the gap between the rear end portion of the roof side rail and the front end portion of the exterior part can be minimized to a low level, appearance commodity properties can be improved.

(10) In the aspect of the above-mentioned (7), the vehicular roof structure may include a connecting bracket configured to connect a rear damper housing provided below the horizontal joining section and the inner gate pillar in an upward/downward direction.

In the aspect of the above-mentioned (10), the head section of the rear damper housing and the inner gate pillar can be connected by the connecting bracket in the upward/downward direction. The exterior part (for example, the tail gate hinge or the like) is attached to the inner gate pillar via the horizontal joining section. Accordingly, the load input to the exterior part in the upward/downward direction (a longitudinal axis direction) can be supported by the entire rear damper housing.

(11) In the aspect of any one of the above-mentioned (3) to (10), the vehicular roof structure may include a rail joining section to which the roof panel and the roof side rail are joined and that is formed in a concave shape; a first gap in communication with the rail joining section and formed between the rear end portion of the roof side rail and the exterior part; and a second gap in communication with the rail joining section and formed between the outer side portion of the roof panel and the exterior part, and wherein water on a surface of the roof panel may be drained from the rail joining section, the first gap and the second gap toward a rearward side of the vehicle body via the front section of the gate pillar.

In the aspect of the above-mentioned (11), water on the surface of the roof panel (from rain or car washing) is drained toward a rear side of the vehicle body from the rail joining section, the first gap and the second gap via the front section of the exterior part. Accordingly, the water on the surface of the roof panel can be prevented from flowing to the surface of the exterior part, and appearance or quality of the vehicle can be improved. For example, when the exterior part is the tail gate, since the water on the surface can be prevented from flowing to the surface of the rear window glass of the tail gate, appearance or quality of the vehicle can be appropriately secured.

According to the vehicular roof structure of the present invention, the inclined joining section and the vertical section are formed on the roof panel, and the roof side rail is joined to the inclined joining section through brazing. Further, the exterior part can be attached to the horizontal joining section protruding from the vertical section toward an outward side in the vehicle width direction. Accordingly, in a state in which the roof side rail is joined to the roof panel through brazing, the exterior part can be attached to the outer side portion of the roof panel.

DETAILED DESCRIPTION OF THE INVENTION

Figure 1:
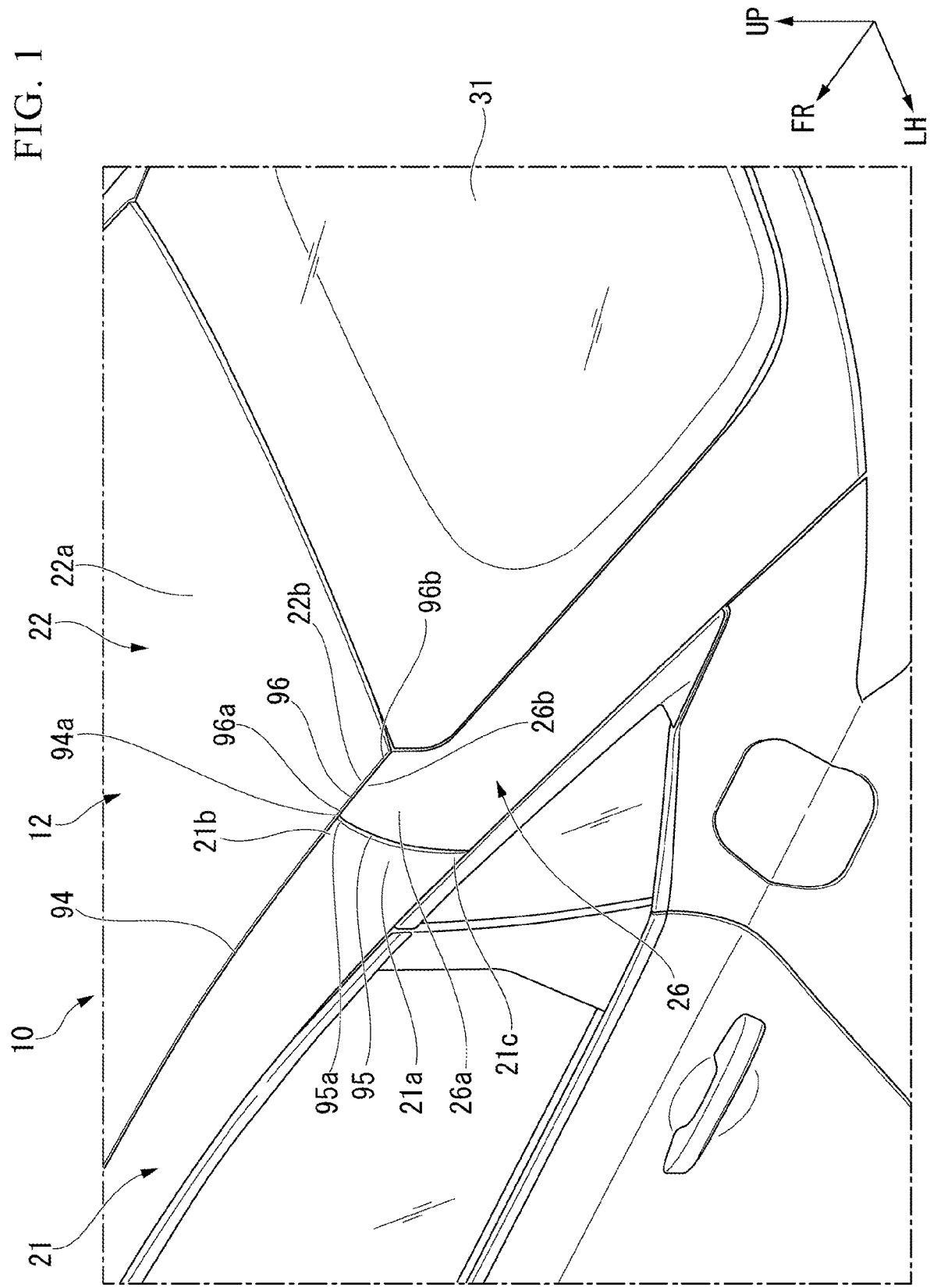
FIG. 1 is a perspective view showing a vehicle including a vehicular roof structure of an embodiment according to the present invention.

Hereinafter, a vehicle upper section structure 10 of an embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle. The vehicle upper section structure 10 has a substantially laterally symmetrical configuration, a configuration on a left side will be described, and description of a configuration on a right side will be omitted.

Figure 2:
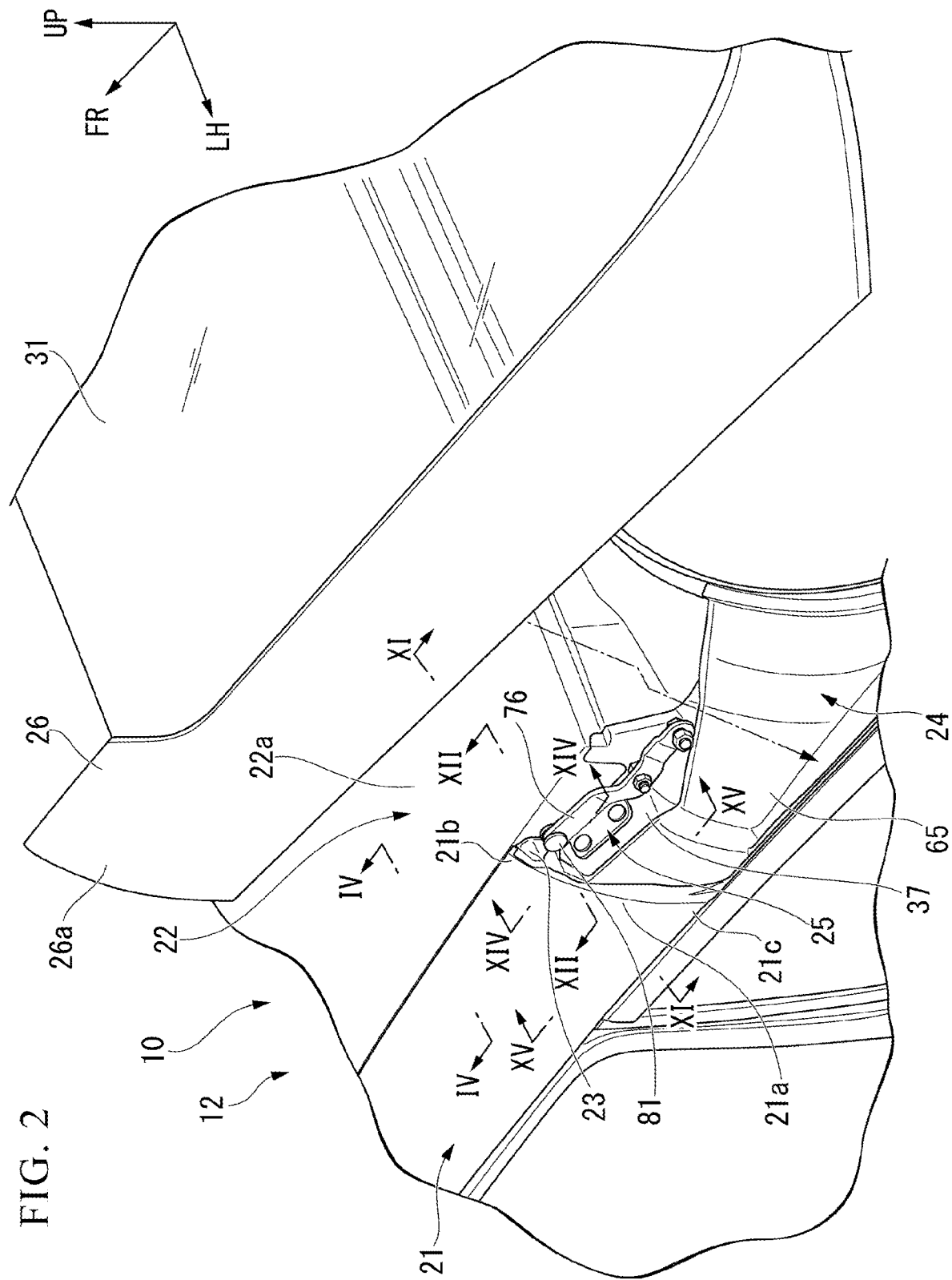
FIG. 2 is a perspective view showing a state in which a tail gate is disassembled from the vehicle in FIG. 1.
Figure 11:
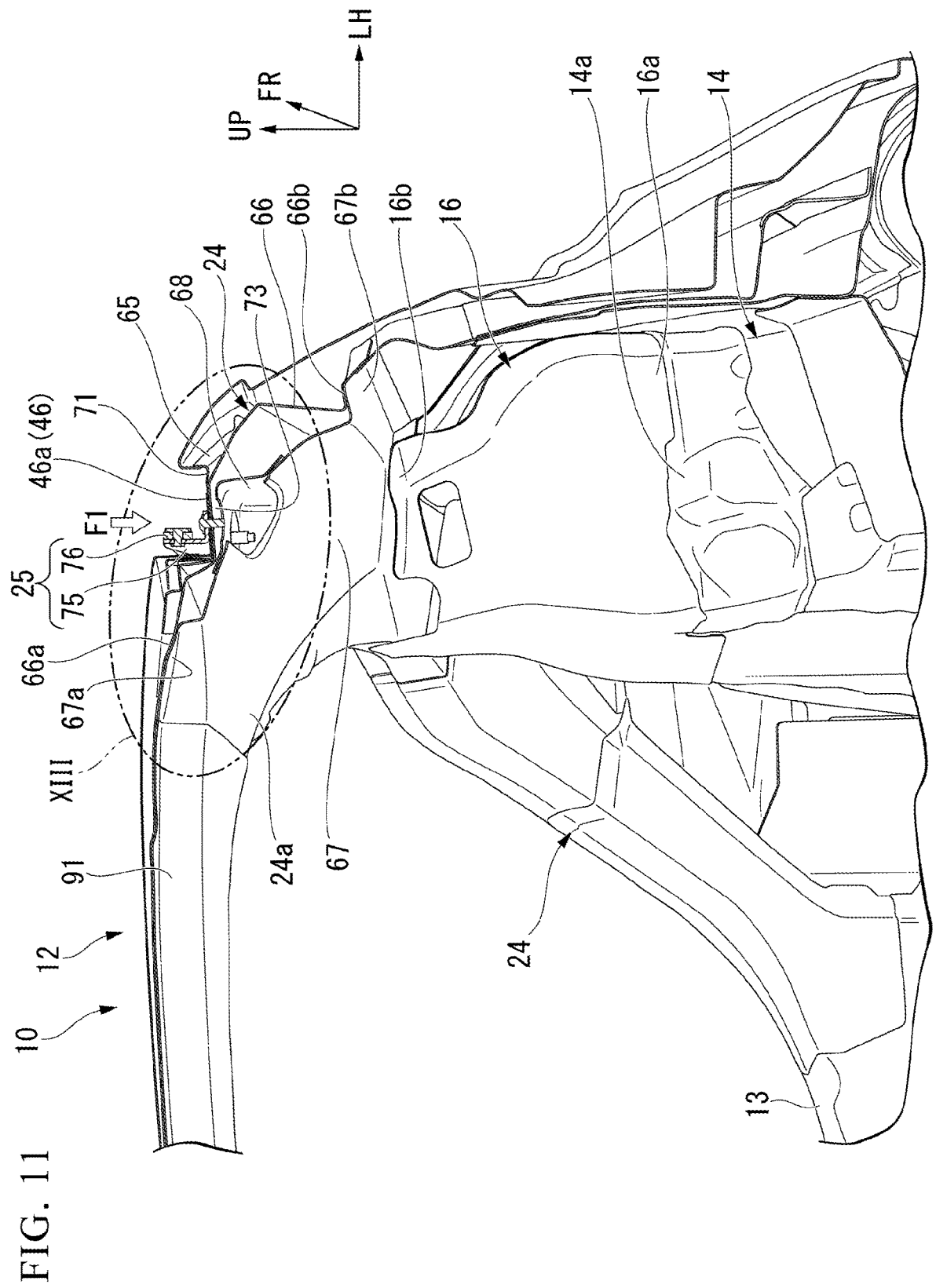
FIG. 11 is a cross-sectional view alone line XI-XI in FIG. 2.

As shown in FIG. 1 and FIG. 2, the vehicle upper section structure 10 includes a vehicular roof structure 12, a rear damper housing 14 (see FIG. 11) and a connecting bracket 16 (see FIG. 11).

The vehicular roof structure 12 includes roof side rails 21, a roof panel 22, a shielding plate 23, a gate pillar 24, a tail gate hinge (exterior parts) 25 and a tail gate (an exterior part) 26. The tail gate 26 includes a rear window glass 31.

Figure 3:
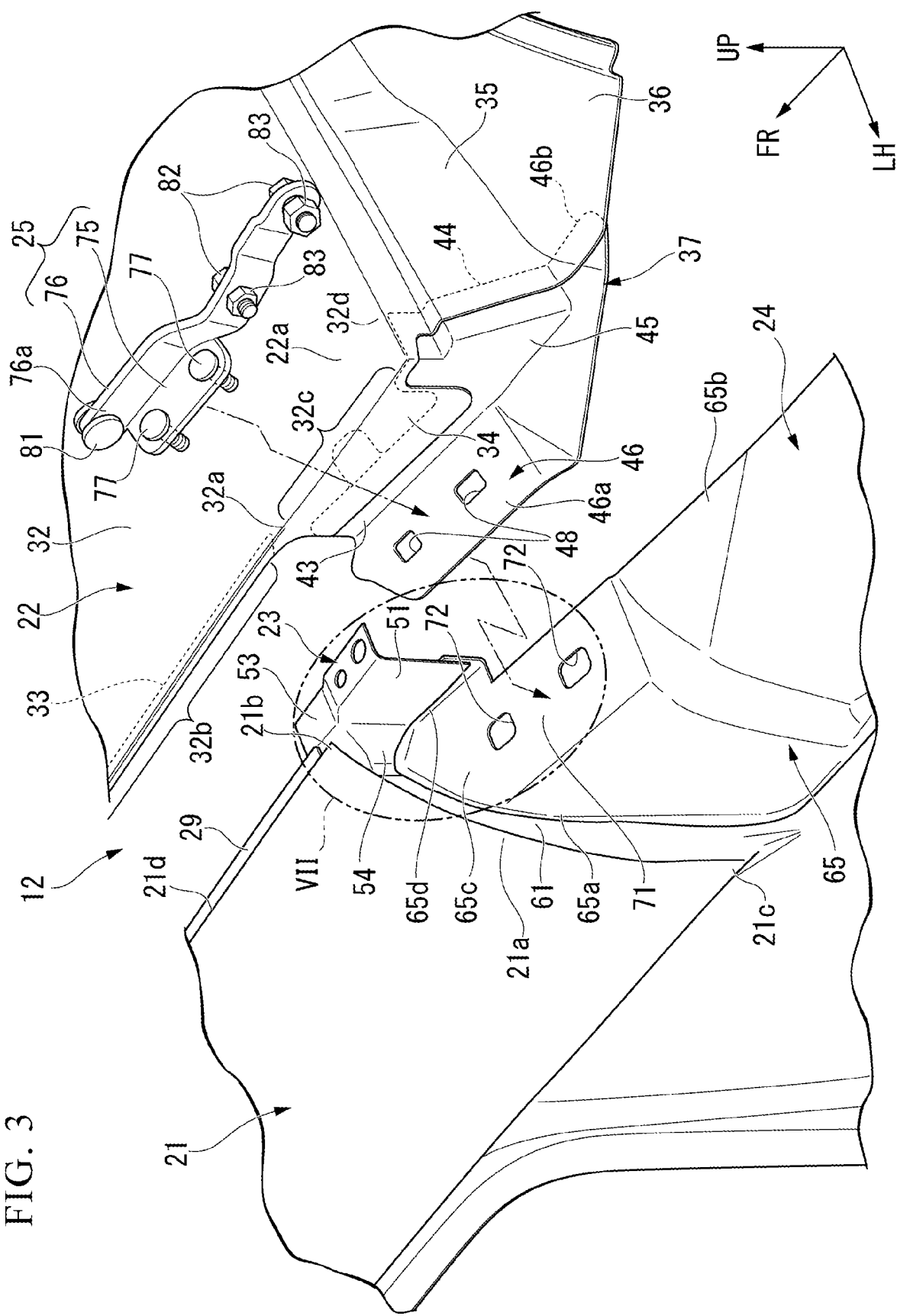
FIG. 3 is an exploded perspective view showing the vehicular roof structure of the embodiment.
Figure 4:
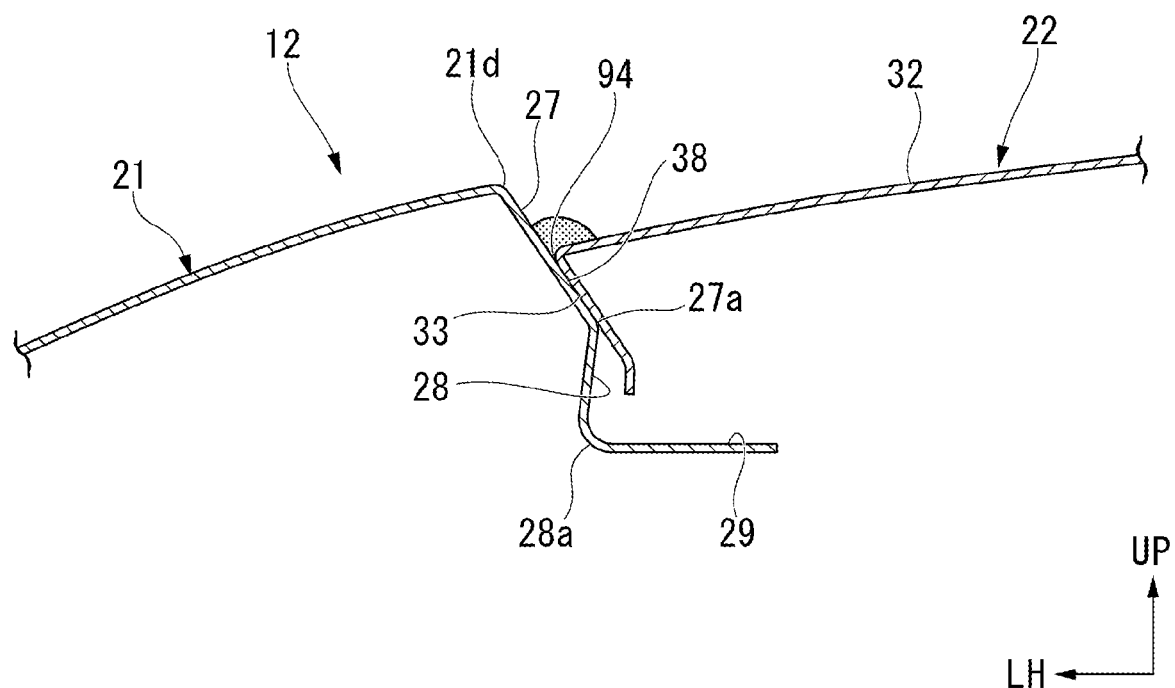
FIG. 4 is a cross-sectional view along line IV-IV in FIG. 2.

As shown in FIG. 3 and FIG. 4, the roof side rail 21 extends in a vehicle body forward/rearward direction in a left outer side portion (an outer side portion) in a vehicle width direction. The roof side rail 21 is inclined at a downward gradient such that a rear end portion 21*a* is directed toward a rear side of the vehicle body from an upper inner end (an upper end) 21*b* to a lower outer end (a lower end) 21*c*. The upper inner end 21*b* is disposed at an inner upper side in the vehicle width direction, and the lower outer end 21*c* is disposed at an outer lower side in the vehicle width direction.

The roof side rail 21 has a first folded section 27, a second folded section 28 and a third folded section 29. The first folded section 27 is bent at a downward gradient from an upper side 21*d* of the roof side rail 21 toward an inner side in the vehicle width direction. The second folded section 28 is bent vertically downward from a lower side 27*a* of the first folded section 27. The third folded section 29 is bent horizontally from a lower side 28*a* of the second folded section 28 toward an inner side in the vehicle width direction.

A gate pillar cover 65 extends from the rear end portion 21*a* of the roof side rail 21 toward a rear side of the vehicle body. In the gate pillar cover 65, a front end portion 65*a* is joined to the rear end portion 21*a* of the roof side rail 21, and an upper side 65*b* extends from the rear end portion 21*a* of the roof side rail 21 toward a rear side of the vehicle body along the roof panel. The gate pillar cover 65 has a horizontal cover attachment section 71 formed on a front upper section in a flat shape. The cover attachment section 71 has a pair of through-holes 72 formed at an interval in the vehicle body forward/rearward direction. The gate pillar cover 65 is a member that constitutes a part of the gate pillar 24. The gate pillar 24 will be described below in detail.

The roof panel 22 is disposed inside the roof side rails 21 and the gate pillar cover 65 in the vehicle width direction.

The roof panel 22 includes a roof panel main body 32, an inclined joining section 33, a vertical section 34, a bent section 35, a horizontal section 36 and a roof joining section 37. The roof panel main body 32 is provided above the passenger compartment, and for example, formed in a rectangular shape when seen in a plan view. The inclined joining section 33, the vertical section 34 and the roof joining section 37 are provided on a left outer side portion 32*a* of the roof panel main body 32 in the vehicle width direction.

The inclined joining section 33 is bent on an inner side in the vehicle width direction at a downward gradient toward the inner side in the vehicle width direction in a section 32*b* corresponding to the first folded section 27 in the left outer side portion 32*a* of the roof panel main body 32 in the vehicle width direction. The inclined joining section 33 is disposed in contact with the first folded section 27, and joined to the first folded section 27 through brazing (including soldering, laser welding, one-side continuous welding, or the like).

Accordingly, the roof side rail 21 is joined in the vehicle body forward/rearward direction along the left outer side portion 32a of the roof panel main body 32 in the vehicle width direction, and the roof panel 22 is joined to the roof side rail 21 while being mounted thereon from above. Hereinafter, a state in which the inclined joining section 33 and the first folded section 27 are in contact with each other is referred to as "a joint section 38."

Figure 5:
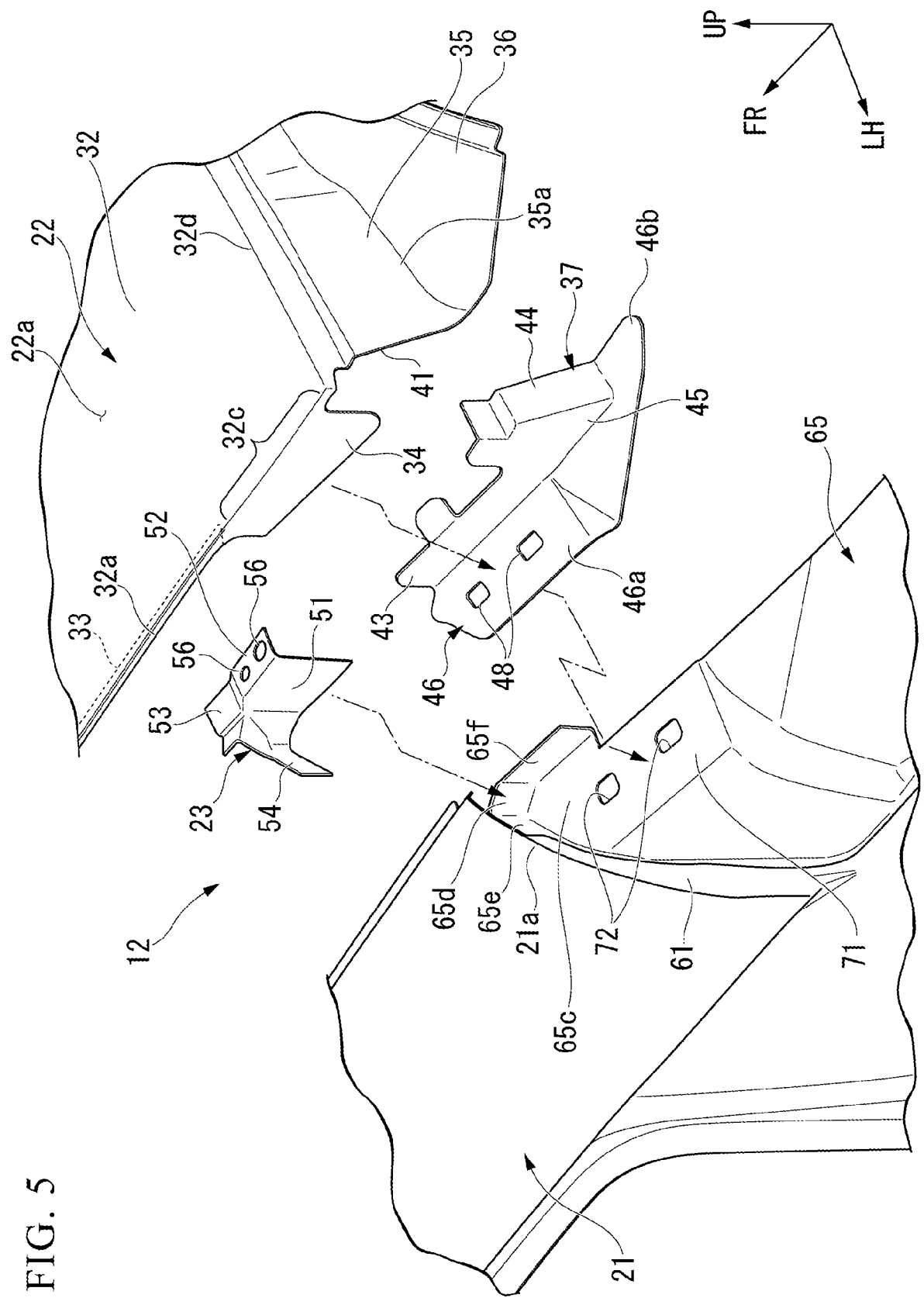
FIG. 5 is an exploded perspective view showing a state in which a roof joining section and a shielding plate of the vehicular roof structure of the embodiment are disassembled.

As shown in FIG. 3 and FIG. 5, the roof panel 22 has the vertical section 34 and the bent section 35 provided on the inclined joining section 33 on a rear side of the vehicle body. Among the left outer side portion 32a of the roof panel main body 32 in the vehicle width direction, the vertical section 34 is bent vertically downward in a section 32c on a rear side of the vehicle body of the inclined joining section 33.

The bent section 35 is bent downward from a rear end portion 32d of the roof panel main body 32. The horizontal section 36 is folded from a lower side 35a of the bent section 35 toward a rear side of the vehicle body.

Incidentally, in the roof panel 22, the inclined joining section 33 and the vertical section 34 are formed on an outer side portion in the vehicle width direction, and the bent section 35 is formed on a rear end portion in the vehicle body forward/rearward direction through pressing. Here, in order to press the vertical section 34 and the bent section 35, a notch (an opening section) 41 is formed in a corner in which the vertical section 34 and the bent section 35 cross each other.

The roof joining section 37 is joined to the vertical section 34, the bent section 35 and the horizontal section 36 of the roof panel 22. The roof joining section 37 has a vertical joining section 43, a bent joining section 44, a joining corner 45 and a horizontal joining section 46.

The vertical joining section 43 is joined to protrude downward along an inner surface of the vertical section 34.

The bent joining section 44 is joined so as to protrude downward along an inner surface of the bent section 35. A second horizontal section 46b of the horizontal joining section 46 is joined to a rear side of the vehicle body so as to protrude along an inner surface of the horizontal section 36. Accordingly, the roof joining section 37 is joined to the vertical section 34, the bent section 35 and the horizontal section 36 of the roof panel 22.

The joining corner 45 is integrally formed between the vertical joining section 43 and the bent joining section 44. The joining corner 45 is disposed in the opening section 41 of the roof panel 22 by joining the roof joining section 37 to the vertical section 34, the bent section 35 and the horizontal section 36 of the roof panel 22. In this state, the joining corner 45 forms a left rear corner of the roof panel 22 by swelling toward an outer side of the roof panel 22 (i.e., an outer side of the vehicle).

The horizontal joining section 46 is formed integrally with lower ends of the vertical joining section 43, the bent joining section 44 and the joining corner 45. The horizontal joining section 46 has a first horizontal section 46a and the second horizontal section 46b. The first horizontal section 46a protrudes from lower end portions of the vertical joining section 43 and the joining corner 45 toward a left outer side (an outer side) in the vehicle width direction. That is, the first horizontal section 46a protrudes leftward and outward from the vertical section 34 in the vehicle width direction via the vertical joining section 43. The roof joining section 37 is formed in an L-shaped cross section by the first horizontal section 46a of the horizontal joining section 46 and the vertical joining section 43 (see also FIG. 12).

In addition, the second horizontal section 46b protrudes from lower end portions of the bent joining section 44 and the joining corner 45 toward a rear side of the vehicle body and is joined along the inner surface of the horizontal section 36.

In this way, the joining corner 45 protruding toward an outer side of the vehicle can be formed on the roof joining section 37 by providing the roof joining section 37 as a member separate from the roof panel 22. Accordingly, the opening section 41 of the roof panel 22 can be closed by the joining corner 45.

Further, a pair of attachment holes 48 can be formed in the horizontal joining section 46 of the roof joining section 37 at an interval in the vehicle body forward/rearward direction by providing the roof joining section 37 as a member separate from the roof panel 22.

In addition, the first horizontal section 46a of the horizontal joining section 46 protrudes outward from the vertical section 34 in the vehicle width direction by the vertical section 34, the bent section 35 and the horizontal section 36 of the roof panel 22 being jointed to the roof joining section 37. Since the first horizontal section 46a protrudes toward an outer side in the vehicle width direction, the horizontal joining section 46 can be mounted from above and joined to the cover attachment section 71 of the gate pillar 24 (i.e., the vehicle body) through spot welding. Accordingly, strength and rigidity of the horizontal joining section 46 can be secured by reinforcing the horizontal joining section 46 with the gate pillar 24.

That is, the cover attachment section 71 is a section to which the horizontal joining section 46 is attached.

Here, since a portion in which a pressing direction of the roof panel 22 is changed can be cut and pressed, a gap region is formed between the inclined joining section 33 and the vertical section 34. In order to avoid interference when the horizontal joining section 46 is mounted on the cover attachment section 71 of the gate pillar cover 65 from above, a gap region is formed between the inclined joining section 33 and the horizontal joining section 46. Accordingly, a gap region is formed in the vicinity of the rear end portion 21a of the roof side rail 21.

In a state in which the horizontal joining section 46 is joined to the cover attachment section 71 through spot welding, the pair of attachment holes 48 are formed at positions corresponding to the pair of through-holes 72 of the cover attachment section 71.

The tail gate hinge 25 is attached to the horizontal joining section 46 using the pair of attachment holes 48 and the pair of through-holes 72.

Here, the inclined joining section 33 is formed on the roof panel 22, the first folded section 27 of the roof side rail 21 is joined to the inclined joining section 33 through brazing, and the roof side rail 21 is fixed to the roof panel 22. Accordingly, the tail gate hinge 25 of the roof panel 22 can be attached while the roof side rail 21 is joined to the roof panel 22 through brazing.

In addition, when the first folded section 27 of the roof side rail 21 is joined to the inclined joining section 33 of the roof panel 22 through brazing, the horizontal joining section 46 is disposed to be freely movable with respect to the cover attachment section 71 in the vehicle width direction. Accordingly, the horizontal joining section 46 does not interfere with joining of the first folded section 27 to the inclined joining section 33 through brazing.

Further, a plate thickness can be increased by attaching the tail gate hinge 25 to the horizontal joining section 46 and adding a the tail gate hinge 25 to a member such as the horizontal joining section 46, the cover attachment section 71, or the like.

Accordingly, support strength of the tail gate hinge 25 can be increased, and further, coupling strength between the roof panel 22 and the vehicle body can be increased.

Figure 6:
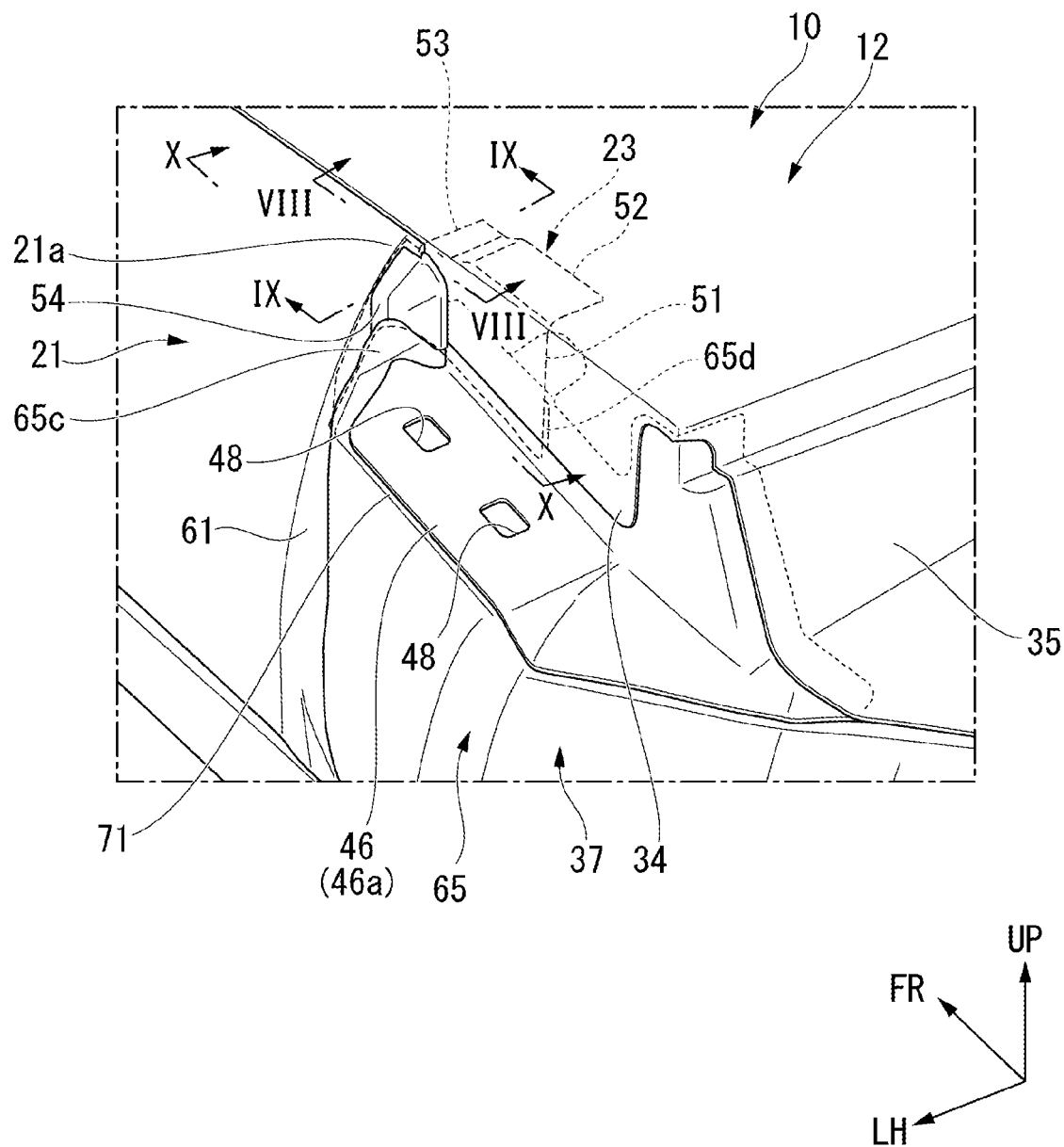
FIG. 6 is a perspective view showing a relation of components of the vehicular roof structure of the embodiment.
Figure 7:
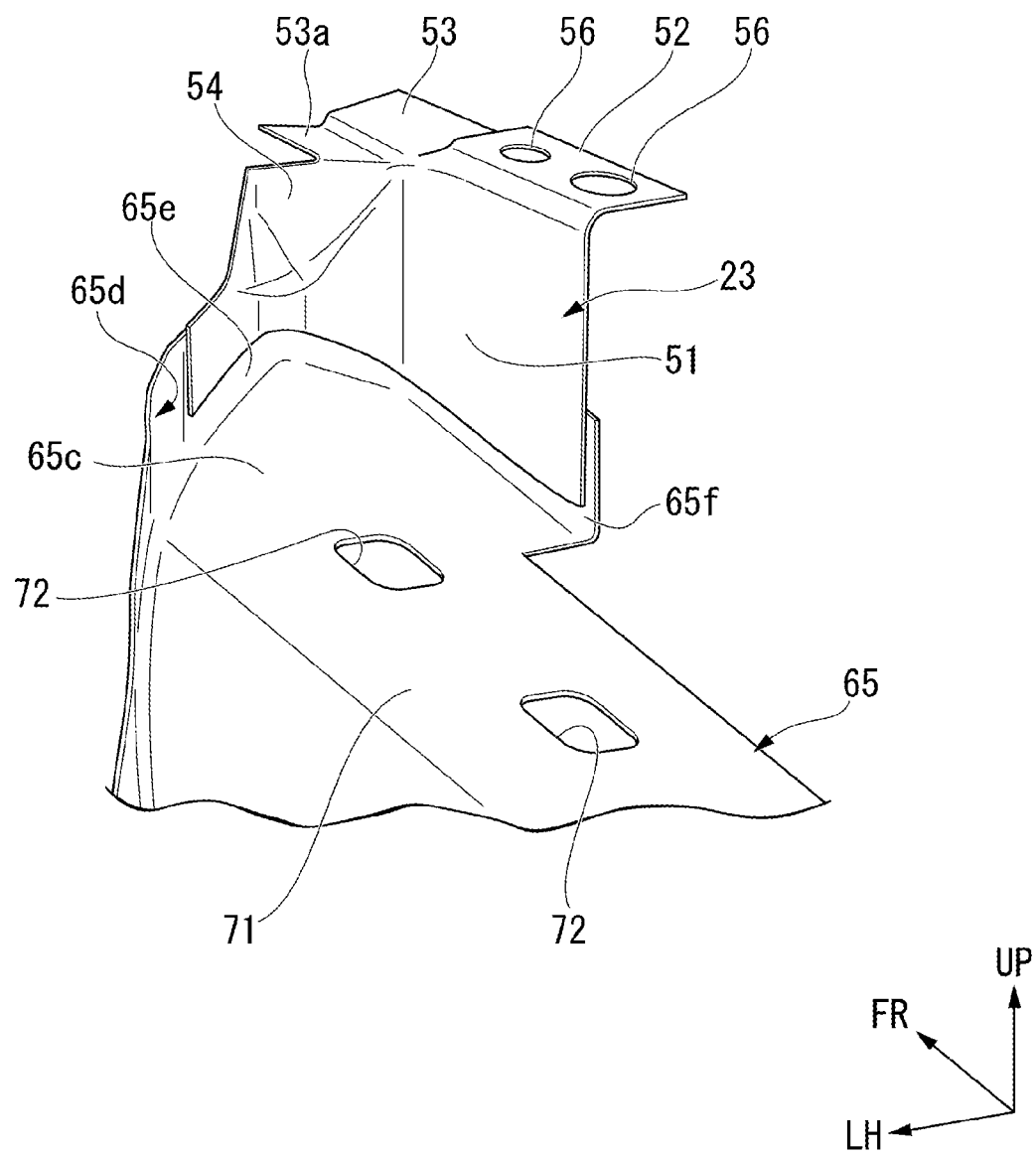
FIG. 7 is an enlarged perspective view showing a portion VII in FIG. 3.

As shown in FIG. 5 to FIG. 7, the shielding plate 23 is joined to a front wall 65*d* of a front upper end portion (a front section of the gate pillar) 65*c* in the gate pillar cover 65. The front wall 65*d* of the gate pillar cover 65 stands upward from the front upper end portion 65*c*, and has a front edge 65*e* and a side edge 65*f*.

In the front wall 65*d*, the front edge 65*e* and the side edge 65*f* are formed in a curved shape (an L-shaped flat surface) along the front upper end portion 65*c* when seen in a plan view.

The shielding plate 23 has a base section (a side shielding wall) 51, a horizontal wall 52, a seal shelf section 53 and a joining extension section (a front shielding wall) 54. The base section 51 is disposed at inner side of the vertical section 34 in the vehicle width direction while standing upward from the side edge 65*f* by being joined to the side edge 65*f* of the gate pillar cover 65 from an outer side in the vehicle width direction.

The horizontal wall 52 is provided on the upper end of the base section 51.

The horizontal wall 52 is disposed above the joining extension section 54, and horizontally folded from an upper end of the base section 51 toward an inner side in the vehicle width direction. The horizontal wall 52 has, for example, a pair of reference holes 56. By forming the pair of reference holes 56 in the horizontal wall 52, when the shielding plate 23 is joined to the front wall 65*d* of the gate pillar cover 65, the shielding plate 23 can be positioned with respect to the front wall 65*d* of the gate pillar cover 65 by the reference holes 56.

The seal shelf section 53 is provided on a front side of the horizontal wall 52. The seal shelf section 53 extends from a front side of the horizontal wall 52 toward a front side of the vehicle body, and is disposed at an inner side of the rear end portion 21*a* of the roof side rail 21 in the vehicle width direction. The reason for providing the seal shelf section 53 on a front side of the horizontal wall 52 will be described below in detail.

The joining extension section 54 is provided on a front side of the base section 51. The joining extension section 54 is provided on a front side of the base section 51, and is disposed at an inner side of the vehicle while standing upward from the front edge 65*e* of the front upper end portion 65*c* of the gate pillar cover 65 (i.e., a front section of the gate pillar 24).

The reason for standing the joining extension section 54 upward from the front edge 65*e* of the front upper end portion 65*c* of the gate pillar cover 65 is as follows.

Figure 8:
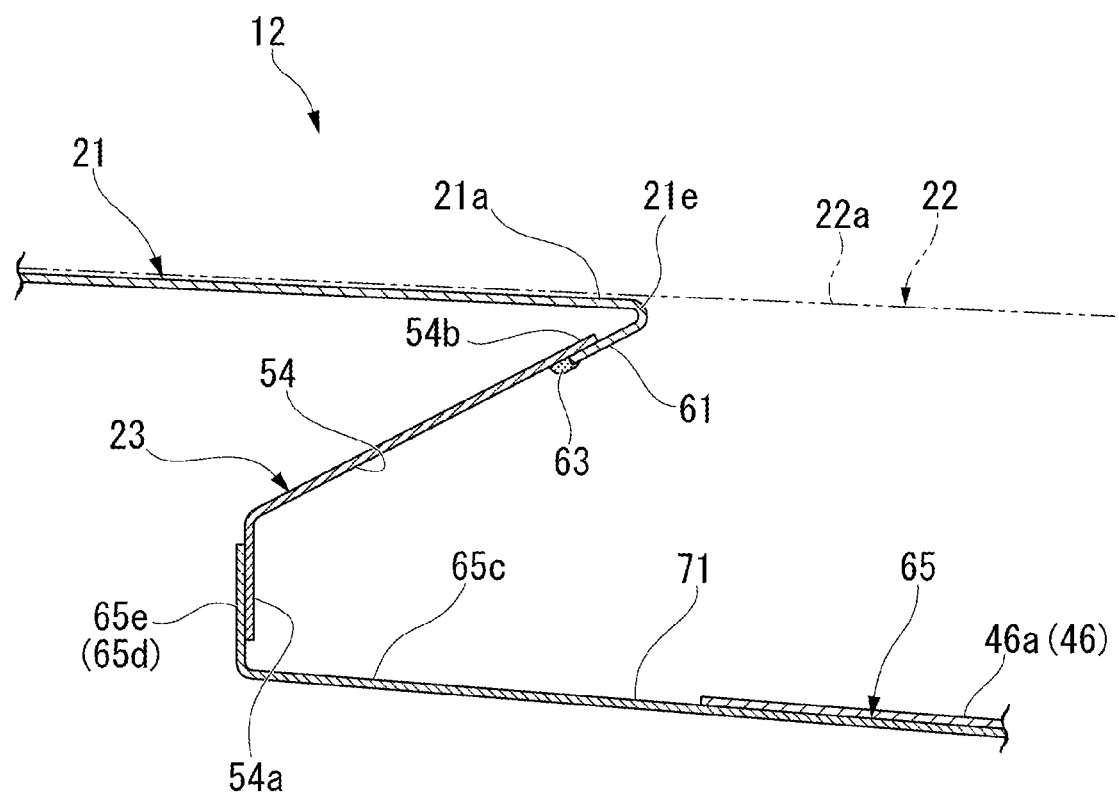
FIG. 8 is a cross-sectional view along line VIII-VIII in FIG. 6.
Figure 9:
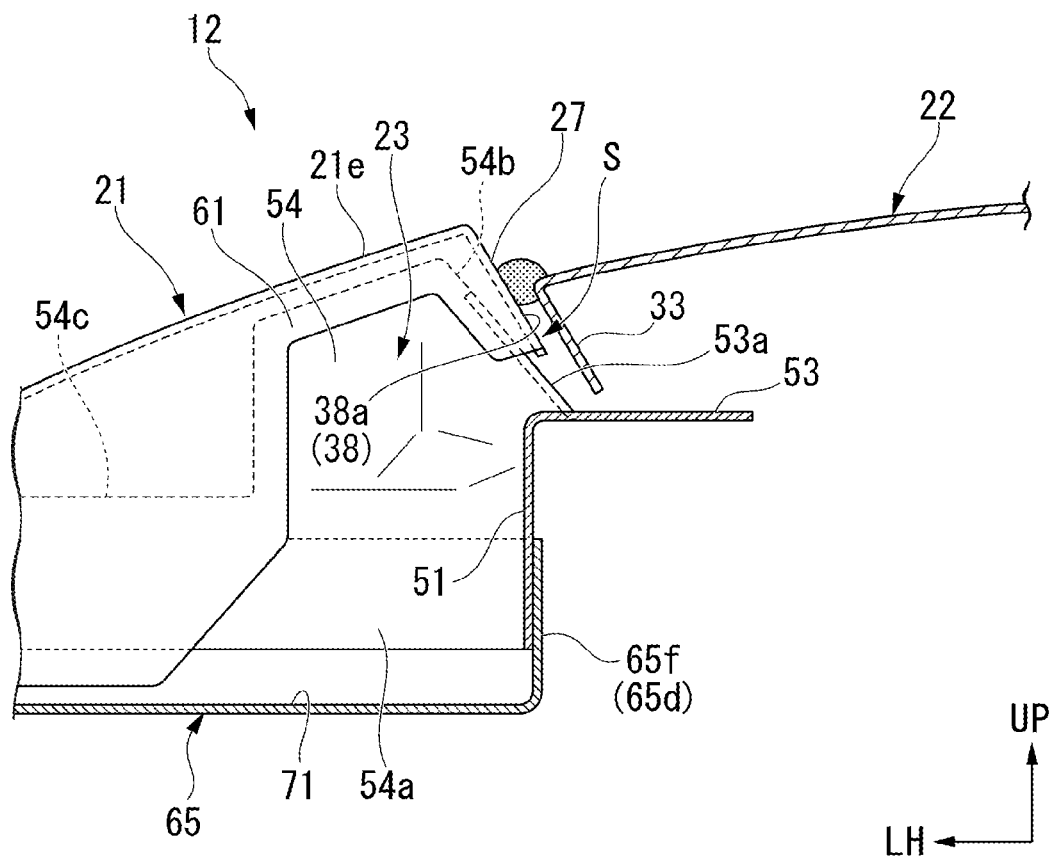
FIG. 9 is a cross-sectional view along line IX-IX in FIG. 6.

As shown in FIG. 5, FIG. 8 and FIG. 9, the horizontal joining section 46 is disposed below the roof panel 22. For this reason, an interval between the horizontal joining section 46 and the roof side rail 21 in the upward/downward direction is greatly secured as it goes inward in the vehicle width direction. In addition, in the roof side rail 21, a rear wall 61 of a rear upper end portion 21*e* among the rear end portion 21*a* overhangs with respect to the front edge 65*e* of the front upper end portion 65*c* of the gate pillar cover 65 while having an interval in a rear side of the vehicle body.

Further, the roof side rail 21 has the first folded section 27 or the like joined to the inclined joining section 33 of the roof panel 22. For this reason, from a viewpoint when the roof side rail 21 is pressed or assembled, it is difficult to extend the rear wall 61 of the rear upper end portion 21*e* of the roof side rail 21 to the front edge 65*e* of the front upper end portion 65*c* of the gate pillar cover 65.

That is, the rear wall 61 of the rear upper end portion 21*e* of the roof side rail 21 is disposed on a front side of the vehicle body with an interval with respect to the front edge 65*e* of the front upper end portion 65*c* of the gate pillar cover 65. For this reason, a gap region is formed between the cover attachment section 71 and the roof panel 22 or between the cover attachment section 71 and the roof side rail 21.

Here, a lower end 54*a* of the joining extension section 54 is joined to the front edge 65*e* of the front upper end portion 65*c* of the gate pillar cover 65, and the joining extension section 54 extends from the front edge 65*e* toward the rear wall 61 of the rear upper end portion 21*e* of the roof side rail 21 at an upward gradient toward a rear side of the vehicle body. A rear side 54*b* of the joining extension section 54 is joined to the rear wall 61 of the rear upper end portion 21*e*.

That is, the joining extension section 54 is disposed in a gap region between the rear wall 61 of the rear upper end portion 21*e* of the roof side rail 21 and the front edge 65*e* of the front upper end portion 65*c* of the gate pillar cover 65, and is joined to the rear wall 61 and the front edge 65*e*. Accordingly, the gap region between the rear wall 61 of the rear upper end portion 21*e* of the roof side rail 21 and the front edge 65*e* of the front upper end portion 65*c* of the gate pillar cover 65 can be closed by the joining extension section 54 of the shielding plate 23.

Incidentally, an interval between the horizontal joining section 46 and the roof side rail 21 in the upward/downward direction is greatly secured as it goes inward in the vehicle width direction. Accordingly, a shape of the shielding plate 23 is increased by closing the gap region between the rear wall 61 of the rear upper end portion 21*e* of the roof side rail 21 and the front edge 65*e* of the front upper end portion 65*c* of the gate pillar cover 65 with the joining extension section 54 of the shielding plate 23. For this reason, it is considered that a painting region to which a sealing material 63 for rust prevention is painted is widened.

Here, as shown in FIG. 7 and FIG. 8, the base section 51 and the joining extension section 54 are provided on the shielding plate 23, and the shielding plate 23 is formed in an L-shaped cross section by the base section 51 and the joining extension section 54 according to the front wall 65*d* of the gate pillar cover 65 (i.e., the front edge 65*e* and the side edge 65*f*). Further, the base section 51 and the joining extension section 54 are joined to the front edge 65*e* and the side edge 65*f* of the front wall 65*d* of the gate pillar cover 65.

Accordingly, the base section 51, the joining extension section 54 and the front wall 65*d* (i.e., the front upper end portion 65*c*) of the gate pillar cover 65 forms an L-shaped three-surface joint structure and strength and rigidity are increased. In the three-surface joint structure, the joining extension section 54 is joined to the rear wall 61 of the rear upper end portion 21*e* of the roof side rail 21. Accordingly, the three-surface joint structure can reinforce the painting region of the sealing material 63, stress concentration can be minimized, and the sealing material 63 can be prevented from being exfoliated from the painting region.

Further, strength and rigidity of the connecting section (i.e., the vehicle body) between the rear wall 61 and the front edge 65*e* can be increased by joining the joining extension section 54 to the rear wall 61 of the roof side rail 21 and the front edge 65*e* of the gate pillar cover 65.

Figure 10:
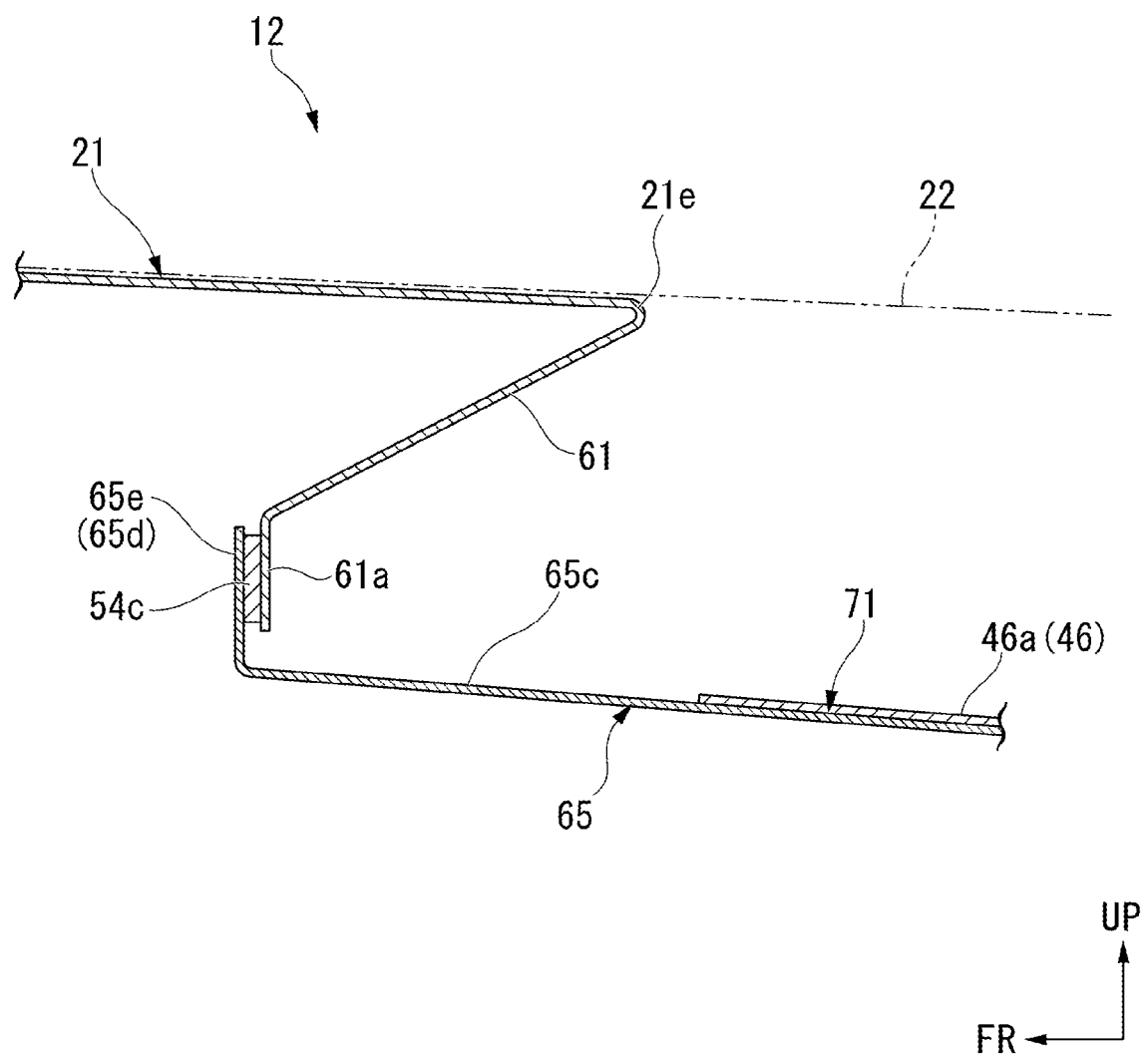
FIG. 10 is a cross-sectional view along line X-X in FIG. 6.

As shown in FIG. 9 and FIG. 10, the joining extension section 54 has a joining tip portion 54*c*. The joining tip portion 54c is formed at a tip portion of the joining extension section 54, and extends outward in the vehicle width direction along the front edge 65e of the front upper end portion 65c of the gate pillar cover 65.

Here, the region in which the joining tip portion 54c is disposed is relatively greatly separated from the first folded section 27, which is joined to the inclined joining section 33 of the roof panel 22, outside in the vehicle width direction. Accordingly, in a viewpoint when the roof side rail 21 is pressed or assembled, it is possible to extend the rear wall 61 of the rear upper end portion 21e of the roof side rail 21 to the front edge 65e of the front upper end portion 65c of the gate pillar cover 65 at a downward gradient toward a front side of the vehicle body.

A front end portion 61a of the rear wall 61 of the rear upper end portion 21e of the roof side rail 21 is folded downward, and disposed to face the front edge 65e of the front upper end portion 65c of the gate pillar cover 65. The joining tip portion 54c of the joining extension section 54 is joined to the front end portion 61a and the front edge 65e while being interposed between the front end portion 61a of the rear wall 61 of the rear upper end portion 21e of the roof side rail 21 and the front edge 65e of the front upper end portion 65c of the gate pillar cover 65.

Accordingly, strength and rigidity of the connecting section (i.e., the vehicle body) between the rear upper end portion 21e of the roof side rail 21 and the front edge 65e of the gate pillar cover 65 are further increased.

Next, the reason for providing the seal shelf section 53 on a front side of the horizontal wall 52 of the shielding plate 23 will be described with reference to FIG. 6 and FIG. 9.

Returning to FIG. 6 and FIG. 9, a gap S is generated because a rear end portion 38a of the joint section 38 is a section in which the inclined joining section 33 of the roof panel 22 is changed to the vertical section 34. The seal shelf section 53 is required to prevent a seal material from dropping from the gap S. The seal shelf section 53 extends from the horizontal wall 52 of the shielding plate 23 toward a front side of the vehicle body. That is, the seal shelf section 53 is provided on the base section 51 on a front side of the vehicle body (see also FIG. 7).

Accordingly, the seal shelf section 53 is disposed below the gap generated in the joint section 38 between the inclined joining section 33 of the roof panel 22 and the first folded section 27 of the roof side rail 21. Accordingly, it is possible to prevent the seal material from dropping from the gap into the vehicle (i.e., a rear side) when the seal material is painted in the gap (i.e., the gap in the joint section 38) between the inclined joining section 33 of the roof panel 22 and the first folded section 27 of the roof side rail 21. Accordingly, the gap in the joint section 38 can be reliably filled with the seal material. Further dropping of the seal material can be prevented by a turning section 53a by adding the turning section 53a having an upward gradient toward an outer side in the vehicle body widthwise direction to the seal shelf section 53 on an outer side of the vehicle.

Figure 12:
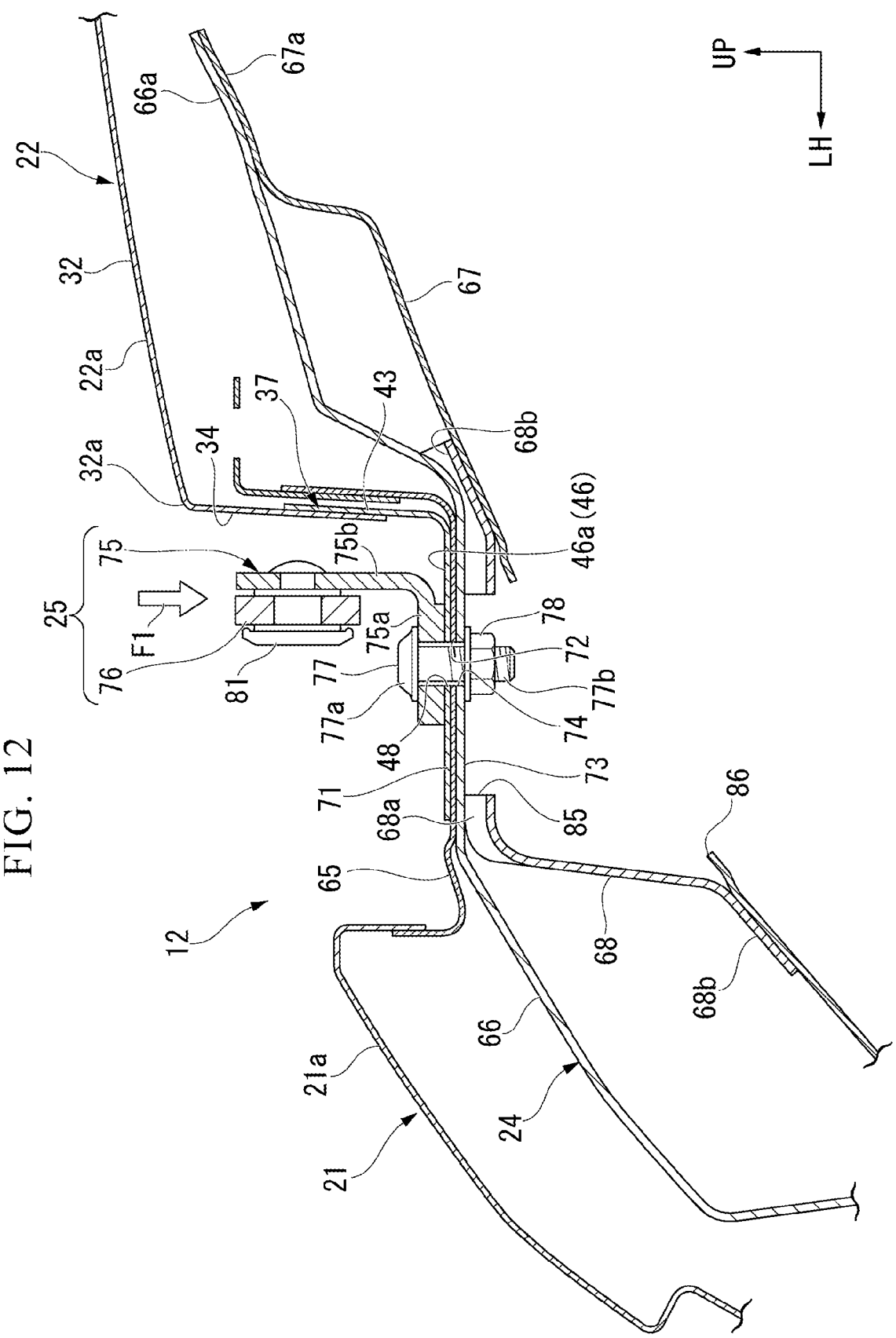
FIG. 12 is a cross-sectional view along line XII-XII in FIG. 2.

As shown in FIG. 11 and FIG. 12, other components (i.e., an outer gate pillar 66, an inner gate pillar 67 and a gusset 68) of the gate pillar 24 are disposed on the gate pillar cover 65 on an inner side of the vehicle. The gate pillar 24 extends from the rear end portion 21a of the roof side rail 21 toward a rear side of the vehicle body (see also FIG. 2). The gate pillar 24 includes the gate pillar cover 65, the outer gate pillar 66, the inner gate pillar 67 and the gusset 68.

The outer gate pillar 66 is provided on the gate pillar cover 65 on an inner side of the vehicle, and extends from the rear end portion 21a of the roof side rail 21 to a vehicle body rear section 13 at a downward gradient toward a rear side of the vehicle body. The outer gate pillar 66 abuts a back surface of the cover attachment section 71. In other words, in the outer gate pillar 66, a pillar support section 73 (i.e., a front section of the outer gate pillar 66) abuts the back surface of the horizontal joining section 46 via the cover attachment section 71. The pillar support section 73 has a pair of insertion holes 74 (only one is shown) formed at positions corresponding to the pair of through-holes 72 at an interval in the vehicle body forward/rearward direction.

The inner gate pillar 67 is provided on the outer gate pillar 66 on an inner side of the vehicle (a side of the passenger compartment). The outer gate pillar 66 and the inner gate pillar 67 are formed in a closed cross section by having the inner flanges 66a and 67a on an inner side in the vehicle width direction jointed with each other and the outer flanges 66b and 67b on an outer side in the vehicle width direction jointed with each other. The gusset 68 is provided between the outer gate pillar 66 and the inner gate pillar 67. In the gusset 68, an upper surface 68a is joined to the outer gate pillar 66, and a lower surface 68b of the gusset 68 is joined to the inner gate pillar 67.

Rigidity of the gate pillar 24 is secured by forming the outer gate pillar 66 and the inner gate pillar 67 to have a closed cross section and joining the gusset 68 between the outer gate pillar 66 and the inner gate pillar 67. Accordingly, the horizontal joining section 46 is strongly attached to the gate pillar 24 (specifically, the cover attachment section 71 and the pillar support section 73).

As shown in FIG. 3 and FIG. 12, the tail gate hinge 25 is attached to the horizontal joining section 46 in a state in which the horizontal joining section 46 is strongly attached to the cover attachment section 71 and the pillar support section 73.

The tail gate hinge 25 includes a support bracket 75 and a connecting lever 76. The support bracket 75 has a horizontal bracket section 75a and a vertical bracket section 75b. A head section 77a is fixed to the horizontal joining section 46 through welding in a state in which a pair of fastening bolts (fastening members) 77 are inserted into the horizontal bracket section 75a while having an interval in the vehicle body forward/rearward direction from above.

The pair of fastening bolts 77 are inserted through the pair of attachment holes 48 of the horizontal joining section 46, the pair of through-holes 72 of the cover attachment section 71 and the pair of insertion holes 74 of the pillar support section 73 from above (an outer side of the vehicle), and the horizontal bracket section 75a is placed on the horizontal joining section 46 from above. In this state, fastening nuts (fastening members) 78 are fastened to screw sections 77b of the pair of fastening bolts 77 protruding from the pair of insertion holes 74 from below (an inner side of the vehicle). Accordingly, the support bracket 75 is attached to the horizontal joining section 46, the cover attachment section 71 and the pillar support section 73. That is, the support bracket 75 is attached to the gate pillar 24 via the horizontal joining section 46.

Here, the vertical joining section 43 that is a member separate from the roof panel 22 is joined to protrude downward along the vertical section 34 of the roof panel 22. In addition, the horizontal joining section 46 is formed integrally with the vertical joining section 43. Accordingly, the horizontal joining section 46 is disposed at a lower position where pressing is normally not able to be performed with respect to a head section (a surface) 22a of the roof panel 22. The tail gate hinge 25 is attached to the horizontal joining section 46.

Accordingly, the tail gate hinge 25 can be attached to a lower side of the head section 22*a* of the roof panel 22 (i.e., an inner side of the vehicle body) without protruding above the head section 22*a* of the roof panel 22 (i.e., an outer surface of the vehicle body).

In addition, the roof joining section 37 having an L-shaped cross section is integrally formed by the horizontal joining section 46 and the vertical joining section 43, and the vertical joining section 43 is joined to the vertical section 34 of the roof panel. Accordingly, only a plate thickness dimension of the roof joining section 37 can be sufficiently greatly secured without increasing the plate thickness dimension of the entire roof panel 22. Accordingly, attachment strength of the tail gate hinge 25 is increased without exerting an influence on reduction in weight of the roof panel 22 (i.e., the vehicle body) in a state in which the tail gate hinge 25 is attached to the horizontal joining section 46.

A front end portion 76*a* of the connecting lever 76 is rotatably connected to the vertical bracket section 75*b* of the support bracket 75 via a hinge shaft 81. A left front end portion (a front end portion) 26*a* (see FIG. 1) of the tail gate 26 (see FIG. 1) is attached to the connecting lever 76 by an attachment bolt 82 and an attachment nut 83. Accordingly, the tail gate 26 is attached to the horizontal joining section 46 and the gate pillar 24 via the tail gate hinge 25 to be freely openable and closable.

Figure 13:
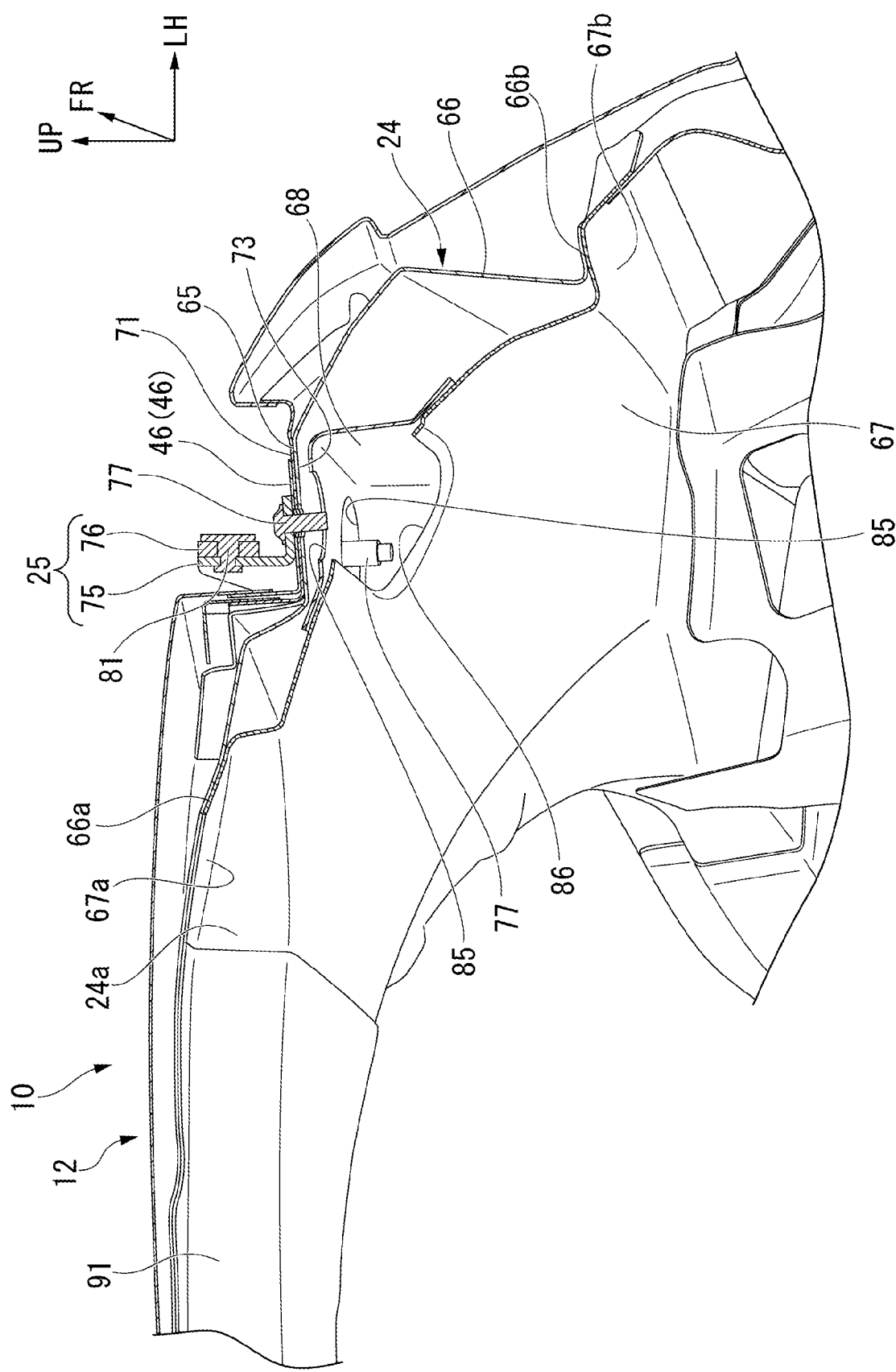
FIG. 13 is an enlarged perspective view of a portion XIII in FIG. 11.

As shown in FIG. 12 and FIG. 13, the gusset 68 of the gate pillar 24 is disposed below the pair of fastening bolts 77 and the pair of fastening nuts 78 configured to attach the tail gate hinge 25 to the gate pillar 24. The gusset 68 has a pair of first working holes (working holes) 85. The pair of first working holes 85 are open at positions corresponding to the pair of fastening bolts 77 and the pair of fastening nuts 78 with an interval in the vehicle body forward/rearward direction.

In addition, the inner gate pillar 67 has second working holes 86. The second working holes 86 are open at positions corresponding to the pair of first working holes 85 (i.e., the pair of fastening bolts 77 and the pair of fastening nuts 78).

Accordingly, a tool can be inserted from below the gusset 68 (i.e., an inner side of the vehicle (a passenger compartment side)) to the pair of fastening bolts 77 via the second working holes 86 and the first working holes 85, and the fastening nuts 78 can be fastened to the pair of fastening bolts 77 by the tool. Accordingly, it is possible to increase a degree of freedom when a process of attaching the tail gate hinge 25 to the horizontal joining section 46 and the gate pillar 24 is determined. Accordingly, the tail gate hinge 25 can be attached to the horizontal joining section 46 and the gate pillar 24 by an appropriate process, and assembly workability can be improved.

Further, when the tail gate hinge 25 is attached to the horizontal joining section 46 and the gate pillar 24 by the fastening bolts 77 and the fastening nuts 78, there is no need to commonly fasten the gusset 68 together with the tail gate hinge 25 by using the fastening bolts 77 and the fastening nuts 78. Accordingly, members that are fastened by the fastening bolts 77 and the fastening nuts 78 can be reduced. Accordingly, when the tail gate hinge 25 is attached to the horizontal joining section 46 and the gate pillar 24, management accuracy of a tightening torque of the fastening bolts 77 and the fastening nuts 78 can be increased. Accordingly, for example, occurrence of rattling or loosening of the tail gate hinge 25 due to torque down or the like with respect to the horizontal joining section 46 and the gate pillar 24 can be minimized.

In addition, the pillar support section 73 of the outer gate pillar 66 abuts a back surface of the horizontal joining section 46 via the cover attachment section 71. In addition, the upper surface 68*a* of the gusset 68 is joined to the outer gate pillar 66, and the lower surface 68*b* of the gusset 68 is joined to the inner gate pillar 67. Accordingly, the tail gate hinge 25 is attached to the pillar support section 73 via the cover attachment section 71 and the horizontal joining section 46. Accordingly, a load F1 input to the tail gate hinge 25 can be transmitted to the inner gate pillar 67 from the outer gate pillar 66 via the gusset 68. Accordingly, the load can be supported by the entire gate pillar 24.

Further, since the gusset 68 is provided between the outer gate pillar 66 and the inner gate pillar 67, the gusset 68 can prevent the gate pillar 24 from being collapsed or twisted. Accordingly, strength and rigidity of the gate pillar 24 can be increased.

As shown in FIG. 11, the rear damper housing 14 is provided below the inner gate pillar 67 of the gate pillar 24. Specifically, the rear damper housing 14 is provided below the horizontal joining section 46, the cover attachment section 71 and the pillar support section 73 (i.e., the tail gate hinge 25). The rear damper housing 14 is provided above a rear wheel, and an upper end portion of a rear damper is supported by a head section (an upper end portion) 14*a*. The rear damper housing 14 supports a load input from the rear damper.

A lower end portion 16*a* of the connecting bracket 16 is joined to the head section 14*a* of the rear damper housing 14. The connecting bracket 16 is standing upward from the head section 14*a* of the rear damper housing 14, and an upper end portion 16*b* is joined to the inner gate pillar 67. That is, the connecting bracket 16 connects the head section 14*a* of the rear damper housing 14 and the inner gate pillar 67 in the upward/downward direction.

A roof cross member 91 extends inward from a front section 24*a* of the inner gate pillar 67 (i.e., the gate pillar 24) in the vehicle width direction.

In this way, the head section 14*a* of the rear damper housing 14 and the inner gate pillar 67 are connected by the connecting bracket 16 in the upward/downward direction. The outer gate pillar 66 is joined to the inner gate pillar 67 via the gusset 68. The tail gate hinge 25 is attached to the pillar support section 73 of the outer gate pillar 66 via the cover attachment section 71 and the horizontal joining section 46. That is, the tail gate hinge 25 is attached to the inner gate pillar 67 via the gusset 68, the outer gate pillar 66 and the horizontal joining section 46.

Accordingly, the load F1 input to the tail gate hinge 25 in the upward/downward direction (a longitudinal axis direction) can be transmitted to the rear damper housing 14 via the connecting bracket 16, and the load F1 can be supported by the entire rear damper housing 14.

Figure 14:
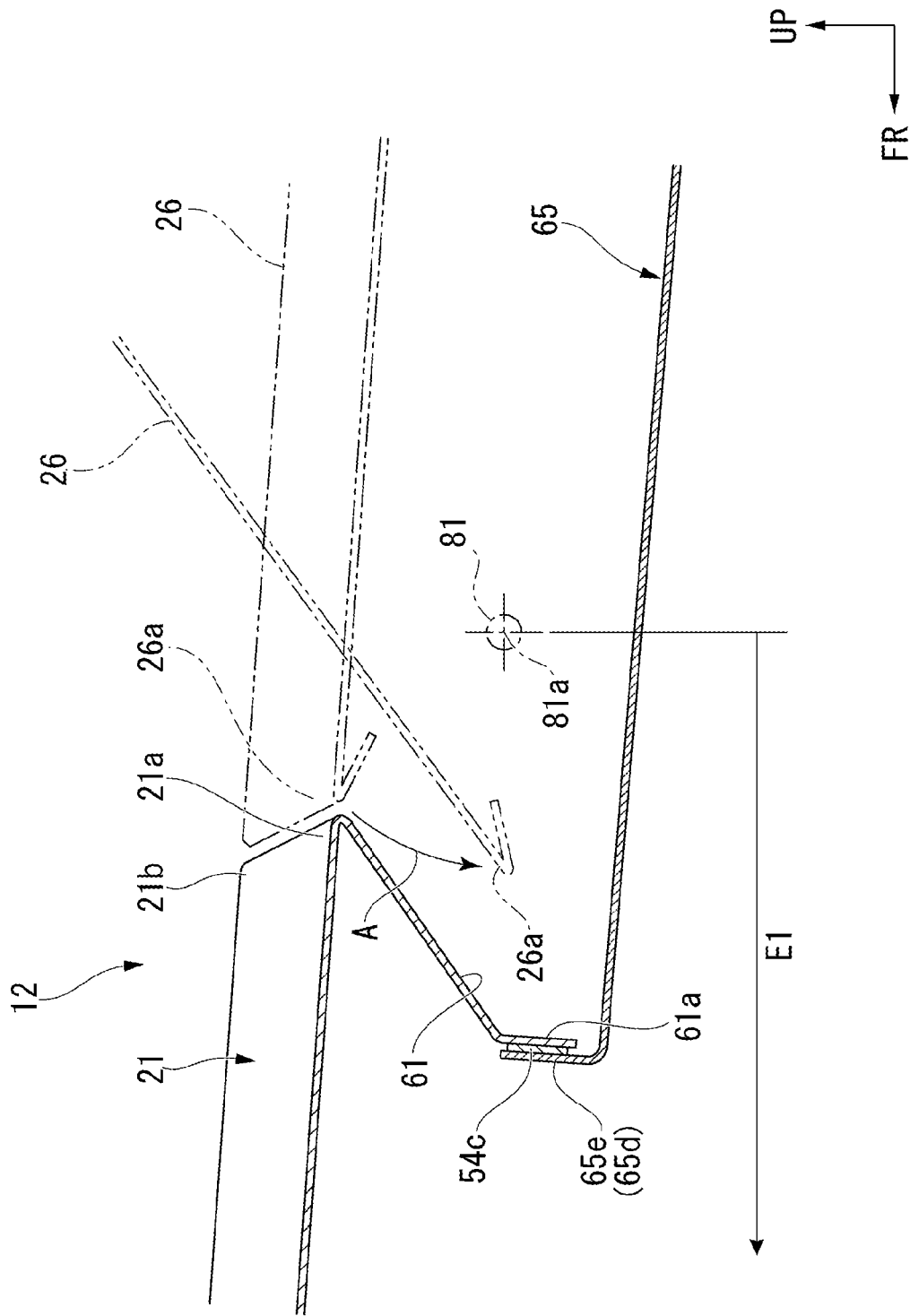
FIG. 14 is a cross-sectional view along line XIV-XIV in FIG. 2.

As shown in FIG. 2 and FIG. 14, the rear end portion 21*a* of the roof side rail 21 is formed from the upper inner end 21*b* to the lower outer end 21*c* in an inclined shape at a downward gradient toward a rear side of the vehicle body.

In addition, the tail gate (an exterior part) 26 has a left front end portion 26*a* formed along the rear end portion 21*a* of the roof side rail 21. The tail gate 26 is supported to be freely openable and closable with respect the vehicle body using the hinge shaft 81 of the tail gate hinge 25 as an axis.

Further, the rear end portion 21*a* of the roof side rail 21 is disposed at a position overhanging toward a rear side of the vehicle body with respect to the front edge 65*e* of the gate pillar cover 65 in a region E1 disposed on a further forward side of the vehicle body than a rotational center 81*a* of the hinge shaft 81.

Accordingly, when the tail gate 26 is opened and closed, the left front end portion 26a of the tail gate 26 can be moved like an arrow A in the region E1 of the overhang. That is, the left front end portion 26a of the tail gate 26 can be prevented from interfering with the rear end portion 21a of the roof side rail 21. Accordingly, in a state in which the tail gate 26 is closed, the left front end portion 26a of the tail gate 26 can approach the rear end portion 21a of the roof side rail 21.

Figure 15:
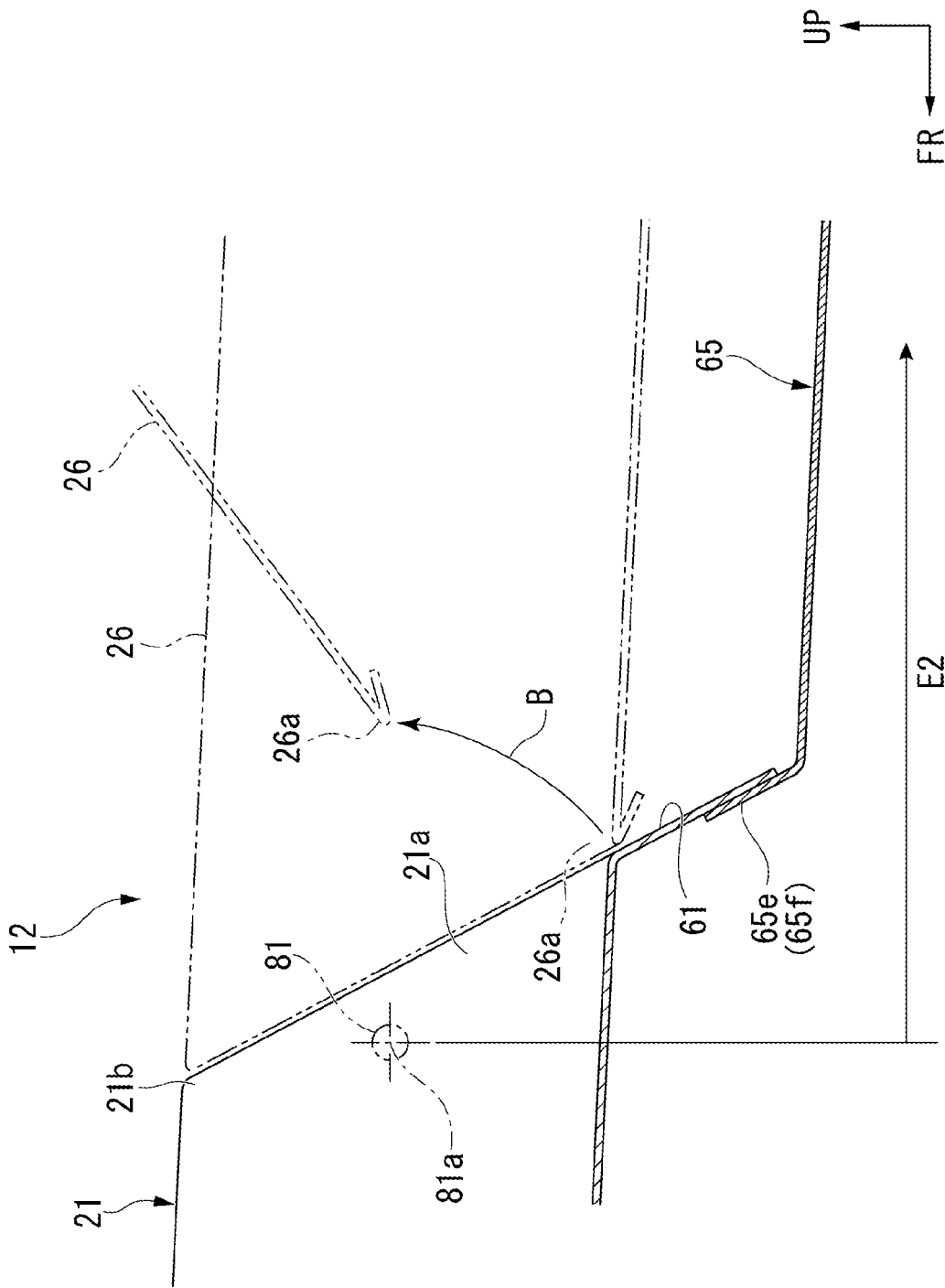
FIG. 15 is a cross-sectional view along line XV-XV in FIG. 2.

As shown in FIG. 2 and FIG. 15, the rear end portion 21a of the roof side rail 21 is disposed on a further forward side of the vehicle body than the front edge 65e of the gate pillar cover 65 in a region E2 disposed on a further rearward side of the vehicle body than the rotational center 81a of the hinge shaft 81. Accordingly, when the tail gate 26 is opened and closed, the left front end portion 26a of the tail gate 26 can be moved above the rear end portion 21a of the roof side rail 21 like an arrow B.

That is, the left front end portion 26a of the tail gate 26 can be prevented from interfering with the rear end portion 21a of the roof side rail 21. Accordingly, in a state in which the tail gate 26 is closed, the left front end portion 26a of the tail gate 26 can approach the rear end portion 21a of the roof side rail 21.

As shown in FIG. 14 and FIG. 15, the left front end portion 26a of the tail gate 26 can approach the rear end portion 21a of the roof side rail 21 in the region E1 in which the rear end portion 21a of the roof side rail 21 is disposed on a further forward side of the vehicle body than the rotational center 81a of the hinge shaft 81. In addition, the left front end portion 26a of the tail gate 26 can approach the rear end portion 21a of the roof side rail 21 in the region E2 in which the rear end portion 21a of the roof side rail 21 is disposed on a further rearward side of the vehicle body than the rotational center 81a of the hinge shaft 81.

Accordingly, since the gap between the rear end portion 21a of the roof side rail 21 and the left front end portion 26a of the tail gate 26 can be minimized to a low level, appearance commodity properties can be improved.

As shown in FIG. 1 and FIG. 4, the vehicular roof structure 12 includes a rail joining section 94, a first gap 95 and a second gap 96. The rail joining section 94 is formed in a concave shape by joining the inclined joining section 33 of the roof panel 22 and the first folded section 27 of the roof side rail 21 through brazing.

In a state in which the tail gate 26 is closed, an upper end portion 95a of the first gap 95 and a front end portion 96a of the second gap 96 come into communication with a rear end portion 94a of the rail joining section 94. The first gap 95 is a gap continuously formed downward from the upper inner end 21b to the lower outer end 21c between the rear end portion 21a of the roof side rail 21 and the left front end portion 26a of the tail gate 26.

The second gap 96 is a gap formed toward a rear side of the vehicle body from the front end portion 96a to a rear end portion 96b between a left outer side portion (an outer side portion) 22b of the roof panel 22 and an inner end portion 26b of the tail gate 26.

Figure 16:
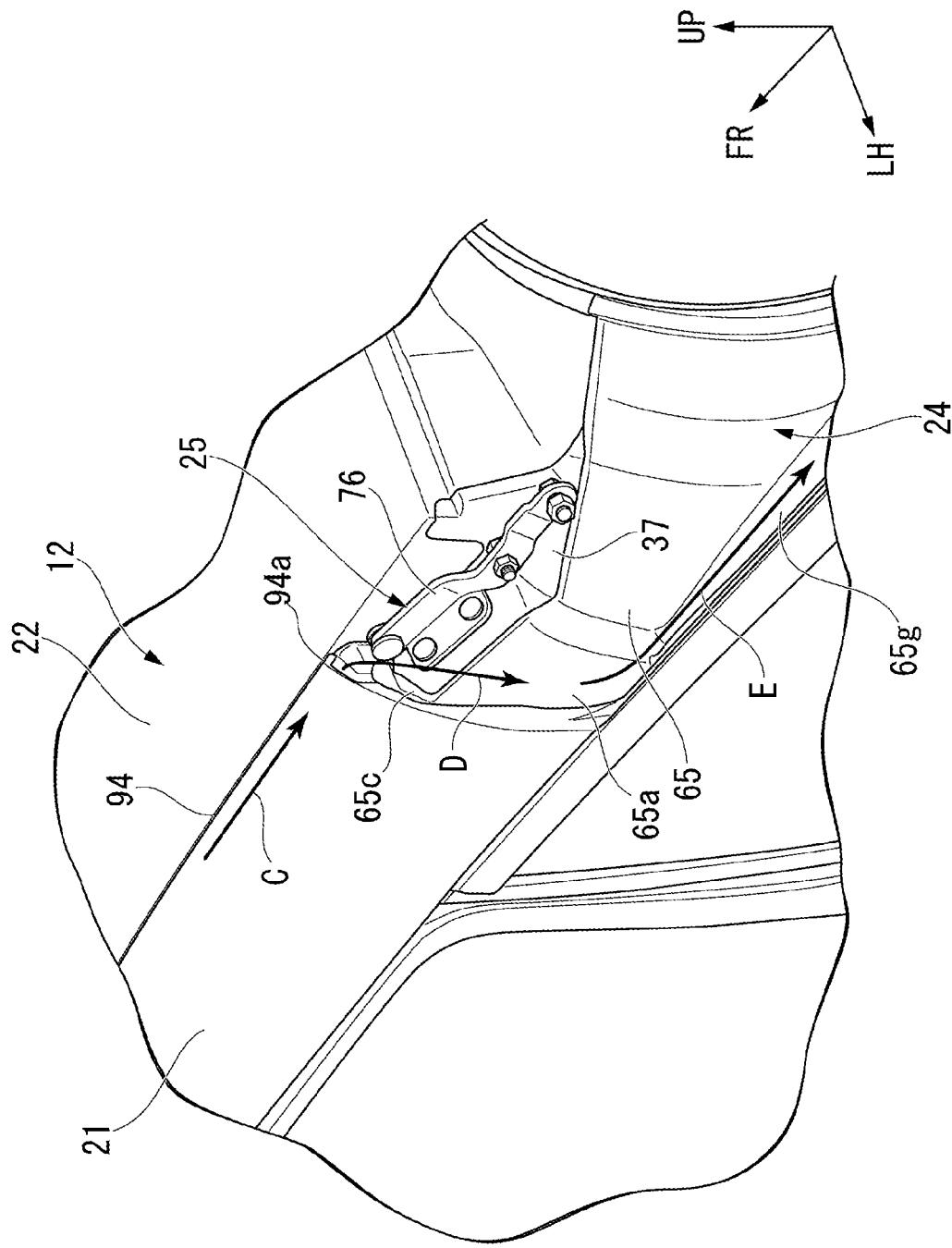
FIG. 16 is a perspective view for describing an example in which water on a roof panel in the vehicular roof structure of the embodiment is drained toward a rear side of a vehicle body.

Accordingly, as shown in FIG. 16, water (upon rainfall or upon car washing) on the head section (the surface) 22a of the roof panel 22 flows to the rear end portion 94a along the rail joining section 94 toward a rear side of the vehicle body like an arrow C. The water flowing to the rear end portion 94a flows to the front upper end portion 65c of the gate pillar cover 65 from the first gap 95 and the second gap 96 (see FIG. 1) like an arrow D. The water flowing to the front upper end portion 65c is drained toward a rear side of the vehicle body along a lower side 65g of the gate pillar cover 65 like an arrow E.

Accordingly, the water on the head section (the surface) 22a of the roof panel 22 can be suppressed from flowing to the rear window glass 31 (see FIG. 1) of the tail gate 26, and appearance or quality of the vehicle can be appropriately secured.

In addition, substitution of the components in the above-mentioned embodiment with known components can be appropriately performed without departing from the scope of the present invention, and further, the above-mentioned variants may be appropriately combined.

For example, while the configuration of the vehicle upper section structure 10 on the left side has been described in the embodiment, a configuration of the vehicle upper section structure 10 on the right side is also formed in the same manner as the configuration on the left side.

In addition, while the example in which the vertical section 34 and the roof joining section 37 are provided on the inclined joining section 33 in a rearward direction of the vehicle body has been described in the embodiment, there is no limitation thereto. As another example, the vertical section 34 and the roof joining section 37 may be provided on the inclined joining section 33 on a forward side of the vehicle body or may be provided on two places in the vehicle body forward/rearward direction.

Further, in the embodiment, while the tail gate hinge 25 or the tail gate 26 has been exemplified as the exterior part, the exterior part can also be applied to another part.

In addition, while the example in which the tail gate hinge 25 is attached by welding the fastening bolts 77 as the fastening member to the horizontal joining section 46 from an outward side of the vehicle and fastening the fastening nuts 78 to the screw sections 77b from an inward side of the vehicle has been described in the embodiment, there is no limitation thereto.

As another example, for example, the tail gate hinge 25 can also be attached by fixing a stud bolt to the pillar support section 73 from an inward side of the vehicle and fastening a fastening nut to a screw section from an outward side of the vehicle (the tail gate hinge 25). Alternatively, the tail gate hinge 25 can also be attached by welding the fastening nuts 78 to the pillar support section 73 from an inward side of the vehicle and fastening a fastening bolt from an outward side of the vehicle (the tail gate hinge 25).

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicular roof structure in which a roof side rail is joined to a roof panel, the roof panel comprising:
    an inclined joining section having an outer side portion bent inward in a vehicle width direction and to which the roof side rail is joined;
    a vertical section provided on at least one side of the inclined joining section in a vehicle body forward/rearward direction and having an outer side portion that is bent vertically;
    a horizontal joining section protruding outward from the vertical section in the vehicle width direction; and an exterior part attached to the horizontal joining section,
wherein the vehicular roof structure further comprises:
a gate pillar extending from the roof side rail toward a rear side of the vehicle body and in which the horizontal joining section is provided; and
a shielding plate joined to a front section of the gate pillar,
wherein the shielding plate has a front shielding wall and a side shielding wall that forms a substantially L-shaped cross section, and
the front shielding wall and the side shielding wall are joined to a front edge and a side edge of the front section of the gate pillar.

2. The vehicular roof structure according to claim 1,
wherein the front edge is joined to a rear end portion of the roof side rail.

3. The vehicular roof structure according to claim 1,
wherein a rear wall of a rear end portion of the roof side rail is disposed while having an interval with respect to the front edge of the front section of the gate pillar in a state the rear wall of the rear end portion of the roof side rail overhangs toward a rear side of the vehicle body, and
the front shielding wall is disposed in a region between the rear wall and the front edge which are disposed so as to have an interval in the vehicle body forward/rearward direction and is joined to the rear wall and the front edge.

4. The vehicular roof structure according to claim 1,
wherein the side shielding wall of the shielding plate is disposed on an inward side of the vehicle in a state standing upward from the front section of the gate pillar, and
the shielding plate comprises a seal shelf section provided on a forward side of the side shielding wall in the vehicle body.

5. The vehicular roof structure according to claim 1,
wherein the gate pillar comprises:
an outer gate pillar that abuts a back surface of the horizontal joining section;
an inner gate pillar provided on the outer gate pillar on an inward side of the vehicle; and
a gusset provided between the outer gate pillar and the inner gate pillar, and
an upper surface of the gusset is joined to the outer gate pillar, and a lower surface of the gusset is joined to the inner gate pillar.

6. The vehicular roof structure according to claim 5,
wherein the gusset has a working hole in a section corresponding to a fastening member configured to attach the exterior part to the horizontal joining section.

7. The vehicular roof structure according to claim 3,
wherein a rear end portion of the roof side rail is formed from an upper end to a lower end in an inclined shape at a downward gradient toward a rear side of the vehicle body,
the exterior part has a front end portion formed along the rear end portion of the roof side rail and is supported to be freely openable and closable with respect to the vehicle body while having a hinge shaft attached to the horizontal joining section as an axis, and
the rear end portion of the roof side rail overhangs toward a rear side of the vehicle body with respect to the front end portion of the gate pillar in a region disposed on a further forward side of the vehicle body than a rotational center of the hinge shaft, and
the rear end portion of the roof side rail is disposed on a further forward side of the vehicle body than the front end portion of the gate pillar in a region disposed on a further rearward side of the vehicle body than the rotational center of the hinge shaft.

8. The vehicular roof structure according to claim 5,
comprising a connecting bracket configured to connect a rear damper housing provided below the horizontal joining section and the inner gate pillar in an upward/downward direction.

9. The vehicular roof structure according to claim 1,
comprising:
a rail joining section to which the roof panel and the roof side rail are joined and that is formed in a concave shape;
a first gap in communication with the rail joining section and formed between the rear end portion of the roof side rail and the exterior part; and
a second gap in communication with the rail joining section and formed between the outer side portion of the roof panel and the exterior part, and
wherein water on a surface of the roof panel is drained from the rail joining section, the first gap and the second gap toward a rear side of the vehicle body via the front section of the gate pillar.

10. A vehicular roof structure in which a roof side rail is joined to a roof panel, the roof panel comprising:
an inclined joining section having an outer side portion bent inward in a vehicle width direction and to which the roof side rail is joined;
a vertical section provided on at least one side of the inclined joining section in a vehicle body forward/rearward direction and having an outer side portion that is bent vertically;
a horizontal joining section protruding outward from the vertical section in the vehicle width direction;
a bent section bent downward from a rear end portion of the roof panel, and
an exterior part attached to the horizontal joining section,
wherein the horizontal joining section is formed integrally with a vertical joining section joined to the horizontal joining section so as to protrude downward along the vertical section and a bent joining section joined to the horizontal joining section so as to protrude downward along the bent section, and
a roof joining section having an L-shaped cross section is formed by the horizontal joining section and the vertical joining section, and the roof joining section protrudes from a lower end portion of the bent joining section toward a rear side of the vehicle body.

* * * * *